US010380050B2

(12) United States Patent
Kim et al.

(10) Patent No.: US 10,380,050 B2
(45) Date of Patent: Aug. 13, 2019

(54) ELECTRONIC DEVICE CONFIGURED TO COMMUNICATE WITH AN EXTERNAL ELECTRONIC DEVICE USING A USB CONNECTOR

(71) Applicant: Samsung Electronics Co., Ltd., Gyeonggi-do (KR)

(72) Inventors: Shin-Ho Kim, Gyeonggi-do (KR); Sung-Bae Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/819,759

(22) Filed: Nov. 21, 2017

(65) Prior Publication Data

US 2018/0143927 A1 May 24, 2018

(30) Foreign Application Priority Data

Nov. 23, 2016 (KR) ........................ 10-2016-0156769

(51) Int. Cl.

*G06F 1/16* (2006.01)
*G06F 3/14* (2006.01)
*G06F 13/38* (2006.01)
*G06F 13/42* (2006.01)
*G06F 9/4401* (2018.01)

(52) U.S. Cl.

CPC .......... *G06F 13/385* (2013.01); *G06F 1/1632* (2013.01); *G06F 3/1454* (2013.01); *G06F 9/4415* (2013.01); *G06F 13/4282* (2013.01); *G06F 2213/0042* (2013.01); *G06F 2213/3806* (2013.01)

(58) Field of Classification Search

CPC ............... G06F 13/385; G06F 13/4282; G06F 2213/0042; G06F 2213/3806; G06F 9/4415

See application file for complete search history.

(56) References Cited

U.S. PATENT DOCUMENTS

| | | | |
|---|---|---|---|
| 8,335,539 | B1 | 12/2012 | Wu |
| 2013/0252600 | A1 | 9/2013 | Seo |

(Continued)

FOREIGN PATENT DOCUMENTS

| | | |
|---|---|---|
| EP | 3 062 214 | 8/2016 |
| KR | 10-2016-0092310 | 8/2016 |

OTHER PUBLICATIONS

European Search Report dated Apr. 6, 2018 issued in counterpart application No. 17203077.7-1224, 7 pages.

*Primary Examiner* — Glenn A. Auve

(74) *Attorney, Agent, or Firm* — The Farrell Law Firm, P.C.

(57) ABSTRACT

An electronic device including a universal serial bus (USB) type-C connector is provided. The electronic device includes a display, a communication interface including the USB type-C connector, and a processor electrically connected to the display and to the communication interface and configured to sense a connection with an external electronic device using the USB type-C connector, receive information relating to the external electronic device from the external electronic device in response to the connection, receive user data, which has been inputted through an input/output component of the external electronic device, from the external electronic device through a pin of the USB type-C connector, and control the electronic device based on the received user data.

21 Claims, 12 Drawing Sheets

(56) References Cited

U.S. PATENT DOCUMENTS

| | | | | |
|---|---|---|---|---|
| 2014/0313414 | A1* | 10/2014 | Wu | H04N 21/4312 348/552 |
| 2016/0147499 | A1 | 5/2016 | Ryu | |
| 2016/0156137 | A1* | 6/2016 | Pan | G06F 13/385 439/78 |
| 2016/0217103 | A1 | 7/2016 | Kim | |
| 2016/0234367 | A1* | 8/2016 | Yoon | H04M 1/7253 |
| 2016/0378971 | A1* | 12/2016 | Dunstan | G06F 21/44 726/17 |
| 2017/0118664 | A1* | 4/2017 | Lee | H04W 4/80 |
| 2017/0168164 | A1* | 6/2017 | Lee | G01S 19/31 |
| 2017/0344498 | A1* | 11/2017 | Voor | G06F 13/161 |
| 2017/0344508 | A1* | 11/2017 | Setiawan | G06F 13/4282 |
| 2017/0371373 | A1* | 12/2017 | Morse | G06F 13/387 |
| 2018/0060262 | A1* | 3/2018 | Kim | G06F 13/102 |
| 2018/0060270 | A1* | 3/2018 | Schnell | G06F 13/4282 |
| 2018/0068412 | A1* | 3/2018 | Schnell | G06T 1/20 |
| 2018/0143916 | A1* | 5/2018 | Gupta | G06F 13/102 |
| 2018/0217956 | A1* | 8/2018 | Watkins | G06F 13/385 |
| 2018/0239732 | A1* | 8/2018 | Yang | G06F 13/4022 |

* cited by examiner

ELECTRONIC DEVICE CONFIGURED TO COMMUNICATE WITH AN EXTERNAL ELECTRONIC DEVICE USING A USB CONNECTOR

PRIORITY

This application claims priority under 35 U.S.C. § 119(a) to Korean Patent Application Serial No. 10-2016-0156769, which was filed in the Korean Intellectual Property Office on Nov. 23, 2016, the entire content of which is incorporated herein by reference.

BACKGROUND

1. Field of the Disclosure

The present disclosure relates generally to an electronic device, and more particularly, to an electronic device configured to communicate with an external electronic device using a universal serial bus (USB) connector.

2. Description of the Related Art

In order to improve the usability of electronic devices, and to satisfy various demands from users, electronic devices are being developed to provide more diversified functions.

In view of the development of electronic devices, data services that connect an electronic device with a computer, an external electronic device, etc., through a wired connection or interface, such that data can be transmitted/received between these devices are also being developed. The wired connector may be used to electrically connect a power supply of the electronic device to a charger. The connector of the electronic device can be a USB type-C connector, which may be used to charge a wireless terminal of the electronic device or to input/output data to/from the electronic device. The USB type-C connector may include a socket mounted on the electronic device and a plug connector to which a wire is connected. The electronic device may transmit content to the external electronic device through the USB type-C connector, and when the electronic device is connected to the external electronic device through the USB type-C connector, the devices may be referred to as a host and a device. For example, when the electronic device is connected to a TV through the USB type-C connector, the electronic device may be designated as a host (e.g., a master), and the TV may be designated as a device (e.g. a slave). When the electronic device is connected to the external electronic device through a USB type-C connector, the electronic device can transmit data to the external electronic device, but the external electronic device cannot transmit data to the electronic device.

For example, when the electronic device is connected to the TV through a USB type-C connector, the electronic device can transmit a display screen image to the TV such that the TV can display the display screen image, but the TV cannot transmit a user's input (or command) for controlling the display screen image to the electronic device.

Accordingly, there is a need for the capability to transmit a user's input to the electronic device such that the user, who watches the display screen image of the electronic device through the external electronic device, can control the display screen image displayed on the external electronic device, thereby allowing the user to control the electronic device through the external electronic device.

SUMMARY

Accordingly, an aspect of the present disclosure provides t an electronic device that can communicate with an external electronic device connected through a USB type-C connector of the electronic device, and a method thereof.

In accordance with an aspect of the present disclosure, there is provided an electronic device comprising a universal serial bus (USB) type-C connector. The electronic device comprises a display, a communication interface comprising a USB type-C connector, and at least one processor electrically connected to the display and to the communication interface and configured to sense a connection with an external electronic device using the USB type-C connector, receive information relating to the external electronic device from the external electronic device in response to the connection, receive user data, which has been inputted through an input/output component of the external electronic device, from the external electronic device through a pin of the USB type-C connector, and control the electronic device based on the received user data.

In accordance with an aspect of the present disclosure, there is provided a method used by an electronic device comprising a universal serial bus (USB) type-C connector for communicating with an external electronic device. The method comprises sensing a connection with the external electronic device using the USB type-C connector, receiving information relating to the external electronic device from the external electronic device in response to the connection, receiving user data, which has been inputted through an input/output component of the external electronic device, from the external electronic device through a pin of the USB type-C connector, and controlling the electronic device based on the received user data.

In accordance with an aspect of the present disclosure, there is provided an electronic device comprising a universal serial bus (USB) type-C connector. The electronic device comprises a display, an input/output component, a communication interface comprising a USB type-C connector, and at least one processor electrically connected to the display and to the communication interface and configured to sense a connection with an external electronic device using the USB type-C connector, receive first information regarding the external electronic device from the external electronic device in response to the connection, and transmit user data, which has been inputted through the input/output component, to the external electronic device through a pin of the USB type-C connector.

In accordance with an aspect of the present disclosure, there is provided a non-transitory computer-readable recording medium having stored thereon a plurality of instructions that when executed cause an electronic device comprising a universal serial bus (USB) type-C connector to communicate with an external electronic device using a method that includes sensing a connection with the external electronic device using the USB type-C connector, receiving information relating to the external electronic device from the external electronic device in response to the connection, receiving user data, which has been inputted through an input/output component of the external electronic device, from the external electronic device through a pin of the USB type-C connector, and controlling the electronic device based on the received user data.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Figure 1:
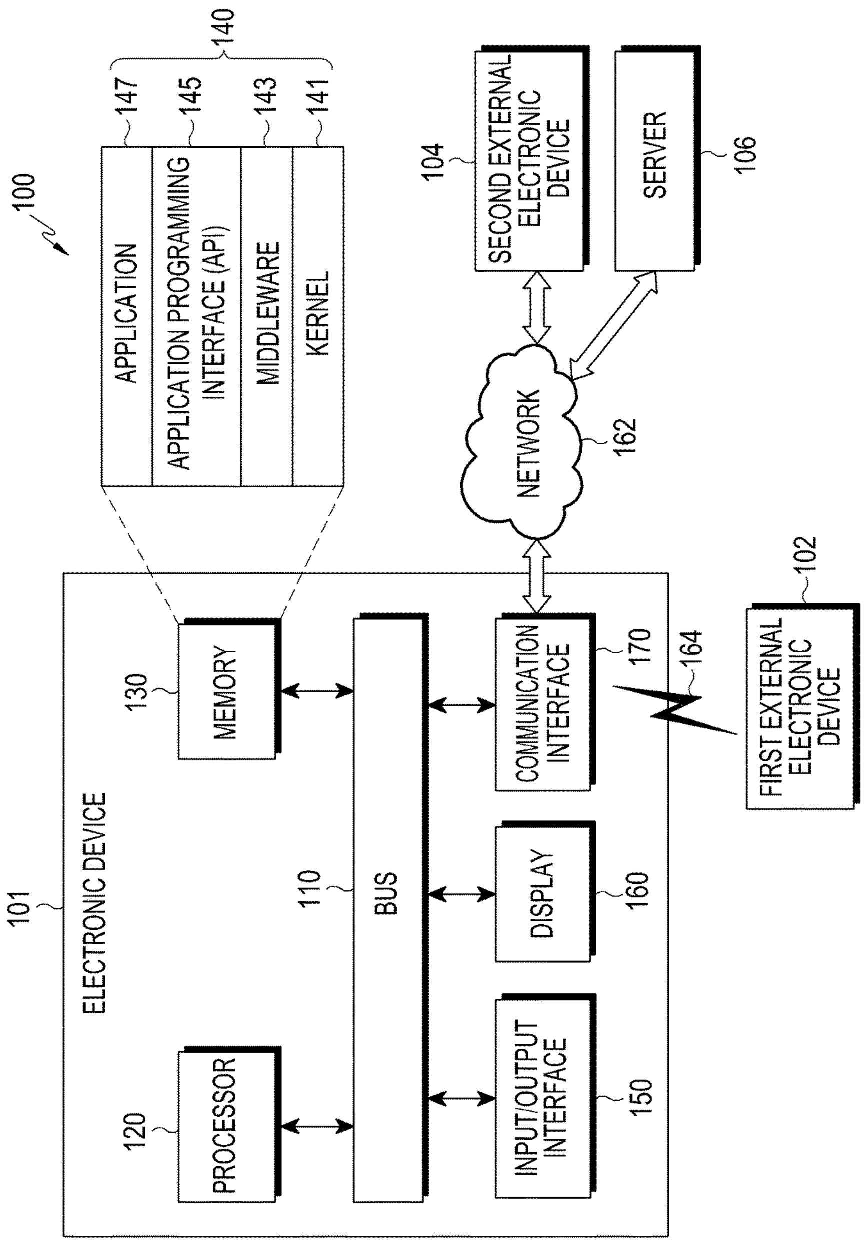
FIG. 1 is a diagram of an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

When an element (e.g., a first element) is "(operatively or communicatively) coupled with/to" or "connected to" another element (e.g., a second element), the first element may be directly coupled with/to the second element, or there may be an intervening element (e.g., a third element) between the first element and the second element. To the contrary, when the first element is "directly coupled with/to" or "directly connected to" the second element there is no intervening element there between.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The term "module" may be interchangeably used with, for example, the term "unit", "logic", "logical block", "component", or "circuit". A "module" may be a minimum unit of an integrated component element or a part thereof. A "module" may be a minimum unit for performing one or more functions or a part thereof. A "module" may be mechanically or electronically implemented. For example, a "module" according to the present disclosure may include at least one of an application-specific integrated circuit (ASIC) chip, a field-programmable gate arrays (FPGA), and a programmable-logic device for performing operations which has been known or are to be developed hereinafter.

An electronic device according to the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type device (e.g., a watch, a ring, a bracelet, an anklet, a necklace, a glasses, a contact lens, or a head-mounted device (HMD)), a fabric or clothing integrated type device (e.g., an electronic clothing), a body-mounted type device (e.g., a skin pad, or tattoo), and a bio-implantable type device (e.g., an implantable circuit).

The electronic device may be a home appliance. The home appliance may include at least one of a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), point of sales (POS) device, or an Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may also be a flexible device. The electronic device may be a combination of one or more of the aforementioned various devices.

Further, the electronic device is not limited to the aforementioned devices, and may include an electronic device according to the development of new technology.

Herein, the term "user" may indicate a person using an electronic device or a device (e.g., an artificial intelligence electronic device) using an electronic device.

FIG. 1 is a diagram of an electronic device 101 in a network environment 100, according to an embodiment of the present disclosure.

The electronic device 101 includes a bus 110, a processor 120, a memory 130, an input/output interface 150, a display 160, and a communication circuit 170. The electronic device 101 may omit at least one of the elements, or may further include other elements.

The bus 110 may include a circuit which interconnects the elements 110 to 170 and delivers communication (e.g., a control message and/or data) between the elements.

The processor 120 may include one or more of a central Processing unit (CPU), an application processor (AP), and a communication processor (CP). The processor 120 may carry out operations or data processing relating to the control and/or communication of at least one other element of the electronic device 101.

The memory 130 may include a volatile and/or non-volatile memory. The memory 130 may store instructions or data relevant to at least one other element of the electronic device 101. The memory 130 may store software and/or a program 140. The program 140 includes a kernel 141, middleware 143, an application programming interface (API) 145, and/or application programs (or applications) 147. At least some of the kernel 141, the middleware 143, and the API 145 may be referred to as an operating system (OS).

The kernel 141 may control or manage system resources (e.g., the bus 110, the processor 120, or the memory 130) used for executing an operation or function implemented by other programs (e.g., the middleware 143, the API 145, or the application 147). The kernel 141 may provide an interface through which the middleware 143, the API 145, or the application 147 may access the individual elements of the electronic device 101 to control or manage the system resources.

The middleware 143 may function as an intermediary for allowing the API 145 or the application 147 to communicate with the kernel 141 to exchange data.

In addition, the middleware 143 may process one or more task requests received from the application 147 according to priorities thereof. The middleware 143 may assign priorities for using the system resources (e.g., the bus 110, the processor 120, the memory 130, or the like) of the electronic device 101, to at least one of the application 147. For example, the middleware 143 may perform scheduling or loading balancing on the one or more task requests by processing the one or more task requests according to the priorities assigned to the one or more application programs.

The API 145 is an interface through which the application 147 can control functions provided from the kernel 141 or the middleware 143, and may include at least one interface or function (e.g., instruction) for file control, window control, image processing, or text control.

The input/output interface 150 may function as an interface that forwards instructions or data, which are input from a user or an external device, to the other element(s) of the electronic device 101. Further, the input/output interface 150 may output instructions or data, which are received from the other element(s) of the electronic device 101, to the user or the external device.

The display 160 may include a liquid crystal display (LCD), a light-emitting diode (LED) display, an organic light-emitting diode (OLED) display, a microelectromechanical systems (MEMS) display, and an electronic paper display. The display 160 may display various types of contents (e.g., text, images, videos, icons, or symbols) to the user. The display 160 may include a touch screen and may receive a touch, gesture, proximity, or hovering input by using an electronic pen or a part of a user's body.

The communication interface 170 may configure communication between the electronic device 101 and an external device (e.g., a first external electronic device 102, a second external electronic device 104, or a server 106). The communication interface 170 may be connected to a network 162 through a wireless or wired communication to communicate with the second external electronic device 104 or the server 106.

The wireless communication may use at least one of long term evolution (LTE), LTE-advance (LTE-A), code division multiple access (CDMA), wideband CDMA (WCDMA), universal mobile telecommunications system (UMTS), WiBro (Wireless Broadband), global system for mobile communications (GSM), and the like, as a cellular communication protocol. In addition, the wireless communication may include short range communication 164. The short range communication 164 may include at least one of wireless fidelity (Wi-Fi), bluetooth (BT), near field communication (NFC), global navigation satellite system (GNSS), etc. The GNSS may include at least one of a global positioning system (GPS), a global navigation satellite system (Glonass), a Beidou navigation satellite system (hereinafter referred to as "Beidou"), and a European global satellite-based navigation system (Galileo), according to a use area, a bandwidth, or the like. GPS may be interchangeably used with the GNSS. The wired communication may include at least one of a USB, a high definition multimedia interface (HDMI), recommended standard 232 (RS-232), a plain old Telephone service (POTS), etc. The network 162 may include at least one of a communication network such as a computer network (e.g., a local area network (LAN) or a wide area network (WAN)), the Internet, and a telephone network.

Each of the first and second external electronic devices 102 and 104 may be of a type identical to or different from that of the electronic device 101. The server 106 may include a group of one or more servers. All or some of the operations executed in the electronic device 101 may be executed in another electronic device or the first and second external electronic devices 102 and 104 or the server 106. When the electronic device 101 has to perform some functions or services automatically or in response to a request, the electronic device 101 may make a request for performing at least some functions relating thereto to the first and second external electronic device 102 or 104 or the server 106 instead of performing the functions or services by itself or in addition. The first and second external electronic device 102 or 104 or the server 106 may execute the requested functions or the additional functions, and may deliver a result of the execution to the electronic apparatus 101. The electronic device 101 may process the received result as it is, or additionally, to provide the requested function or service. To this end, cloud computing, distributed computing, or client-server computing technology may be used.

Figure 2:
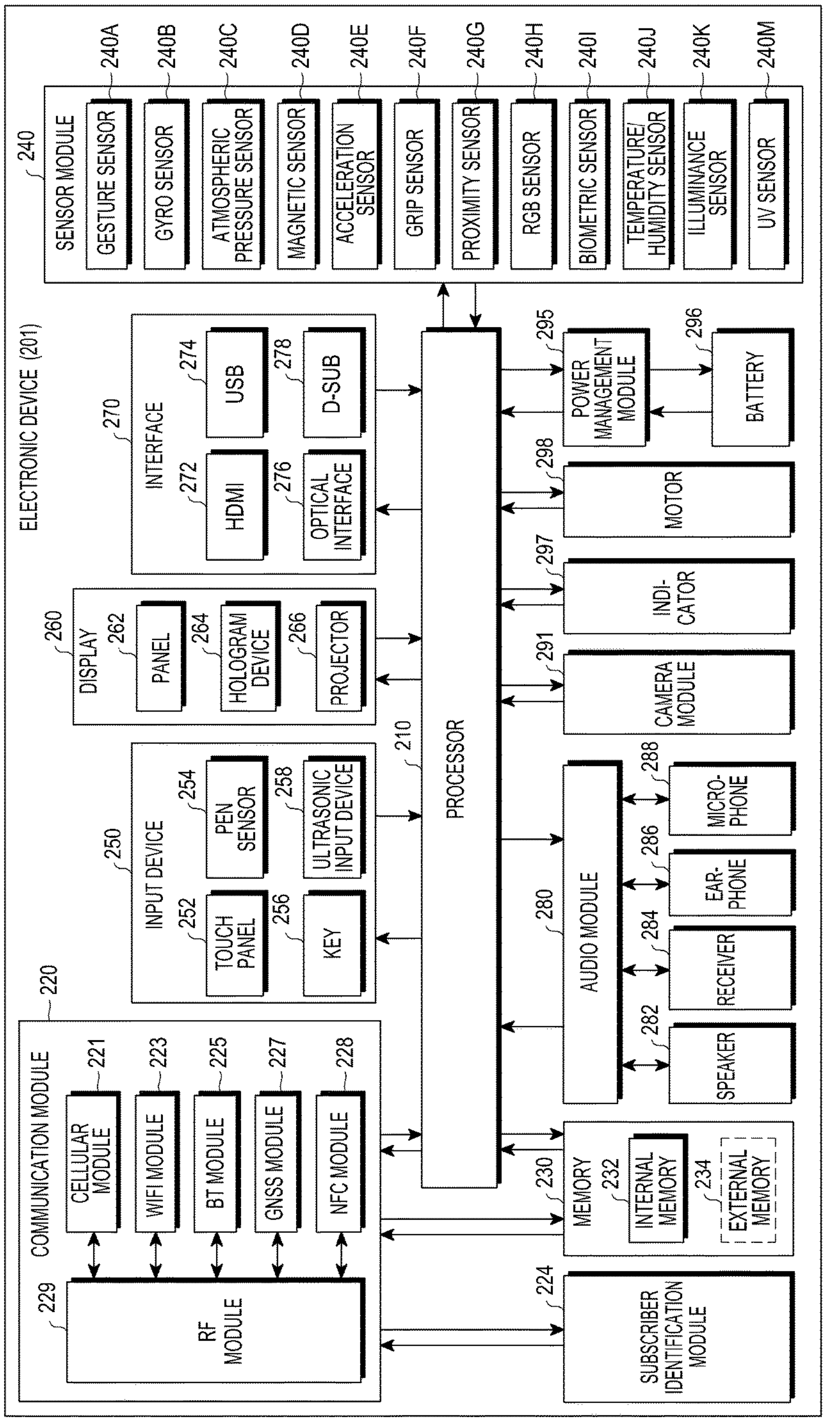
FIG. 2 is a block diagram of an electronic device, according to an embodiment of the present disclosure.

FIG. 2 is a block diagram of an electronic device 201, according to an embodiment of the present disclosure.

Referring to FIG. 2, the electronic device 201 includes at least one AP 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an OS or an AP. The processor 210 may be implemented by a system on chip (SoC). The processor 210 may further include a graphic processing unit (GPU) and/or an image signal processor. The processor 210 may also include at least some of the elements illustrated in FIG. 2 (e.g., a cellular module 221). The processor 210 may load, in a volatile memory, instructions or data received from at least one of the other elements (e.g., a non-volatile memory) to process the loaded instructions or data, and may store various types of data in the non-volatile memory.

The communication module 220 includes a cellular module 221, a Wi-Fi module 223, a BT module 225, a GNSS module 227 (e.g., a GPS module, a Glonass module, a Beidou module, or a Galileo module), an NFC module 228, and a radio frequency (RF) module 229.

The cellular module 221 may provide a voice call, a video call, a text message service, an Internet service, or the like through a communication network. The cellular module 221 may identify and authenticate the electronic device 201 within a communication network using the SIM 224 (e.g., a SIM card). The cellular module 221 may perform at least some of the functions that the processor 210 may provide. The cellular module 221 may include a CP.

Each of the Wi-Fi module 223, the BT module 225, the GNSS module 227, and the NFC module 228 may include a processor for processing data transmitted and received through the corresponding module. At least some (e.g., two or more) of the cellular module 221, the Wi-Fi module 223, the BT module 225, the GNSS module 227, and the NFC module 228 may be included in one integrated chip (IC) or IC package.

The RF module 229 may transmit/receive a communication signal (e.g., an RF signal). The RF module 229 may include a transceiver, a power amplifier module (PAM), a frequency filter, a low noise amplifier (LNA), an antenna, and the like. At least one of the cellular module 221, the Wi-Fi module 223, the BT module 225, the GPS module 227, and the NFC module 228 may transmit/receive an RF signal through a separate RF module.

The SIM 224 may be an embedded SIM, and may contain unique identification information (e.g., an integrated circuit card identifier (ICCID)) or subscriber information (e.g., an international mobile subscriber identity (IMSI)).

The memory 230 includes an internal memory 232 and an external memory 234. The internal memory 232 may include at least one of a volatile memory (e.g., a dynamic random access memory (DRAM), a static RAM (SRAM), a synchronous dynamic RAM (SDRAM), etc.) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), etc.).

The external memory 234 may further include a flash drive a compact flash (CF), a secure digital (SD), a micro-secure digital (Micro-SD), a mini-secure digital (Mini-SD), an extreme digital (xD), a multi-media card (MMC), a memory stick, or the like. The external memory 234 may be functionally and/or physically connected to the electronic device 201 through various interfaces.

The sensor module 240 may measure a physical quantity or detect the operating state of the electronic device 201 and may convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, a luminance sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. The electronic device 201 may further include a processor, which is configured to control the sensor module 240, as a part of the processor 210 or separately from the processor 210 in order to control the sensor module 240 while the processor 210 is in a sleep state.

The input device 250 includes a touch panel 252, a (digital) pen sensor 254, a key 256, and an ultrasonic input device 258. The touch panel 252 may use at least one of a capacitive type, a resistive type, an infrared type, and an ultrasonic type. The touch panel 252 may further include a control circuit. The touch panel 252 may further include a tactile layer to provide a tactile reaction to a user.

The (digital) pen sensor 254 may include a recognition sheet that is a part of, or separate from, the touch panel. The key 256 may include a physical button, an optical key, or a keypad. The ultrasonic input device 258 may detect ultrasonic waves, which are generated by an input tool, through a microphone 288 and may identify data corresponding to the detected ultrasonic waves.

The display 260 includes a panel 262, a hologram device 264, and a projector 266. The panel 262 may be implemented to be flexible, transparent, or wearable. The panel 262, together with the touch panel 252, may be implemented as one module. The hologram device 264 may show a three dimensional image in the air by using an interference of light. The projector 266 may display an image by projecting light onto a screen. The screen may be located in the interior of, or on the exterior of, the electronic device 201. The display 260 may further include a control circuit for controlling the panel 262, the hologram device 264, or the projector 266.

The interface 270 includes an HDMI 272, a USB 274, an optical interface 276, and a d-subminiature (D-sub) 278. Additionally or alternatively, the interface 270 may include a mobile high-definition link (MHL) interface, an SD card/multi-media card (MMC) interface, or an infrared data association (IrDA) standard interface.

The audio module 280 may convert a sound into an electrical signal, and vice versa. The audio module 280 may process sound information that is input or output through a speaker 282, a receiver 284, earphones 286, the microphone 288, and the like.

The camera module 291 is a device that can photograph a still image and a dynamic image. The camera module 291 may include one or more image sensors (e.g., a front sensor or a rear sensor), a lens, an image signal processor (ISP), or a flash (e.g., an LED, a xenon lamp, etc.).

The power management module 295 may manage the power of the electronic device 201. The electronic device 201 may be an electronic device that receives power through the battery, but is not limited thereto. The power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure a residual quantity of the battery 296, and a voltage, a current, or a temperature while charging. The battery 296 may include a rechargeable battery and/or a solar battery.

The indicator 297 may display a particular state, e.g., a booting state, a message state, a charging state, or the like of the electronic device 201 or a part (e.g., the processor 210) of the electronic device 201. The motor 298 may convert an electrical signal into a mechanical vibration and may generate a vibration, a haptic effect, etc. Although not illustrated, the electronic device 201 may include a processing unit (e.g., a GPU) for supporting mobile TV. The processing unit for supporting the mobile TV may process media data according to a standard, such as digital multimedia broadcasting (DMB), digital video broadcasting (DVB), MediaFlo™, etc.

Each of the above-described component elements of hardware may be configured with one or more components, and the names of the corresponding component elements may vary based on the type of electronic device. The electronic device 201 may include at least one of the aforementioned elements. Some elements may be omitted or other additional elements may be further included in the electronic device 201. Also, some of the hardware components may be combined into one entity, which may perform functions identical to those of the relevant components before the combination.

Figure 3:
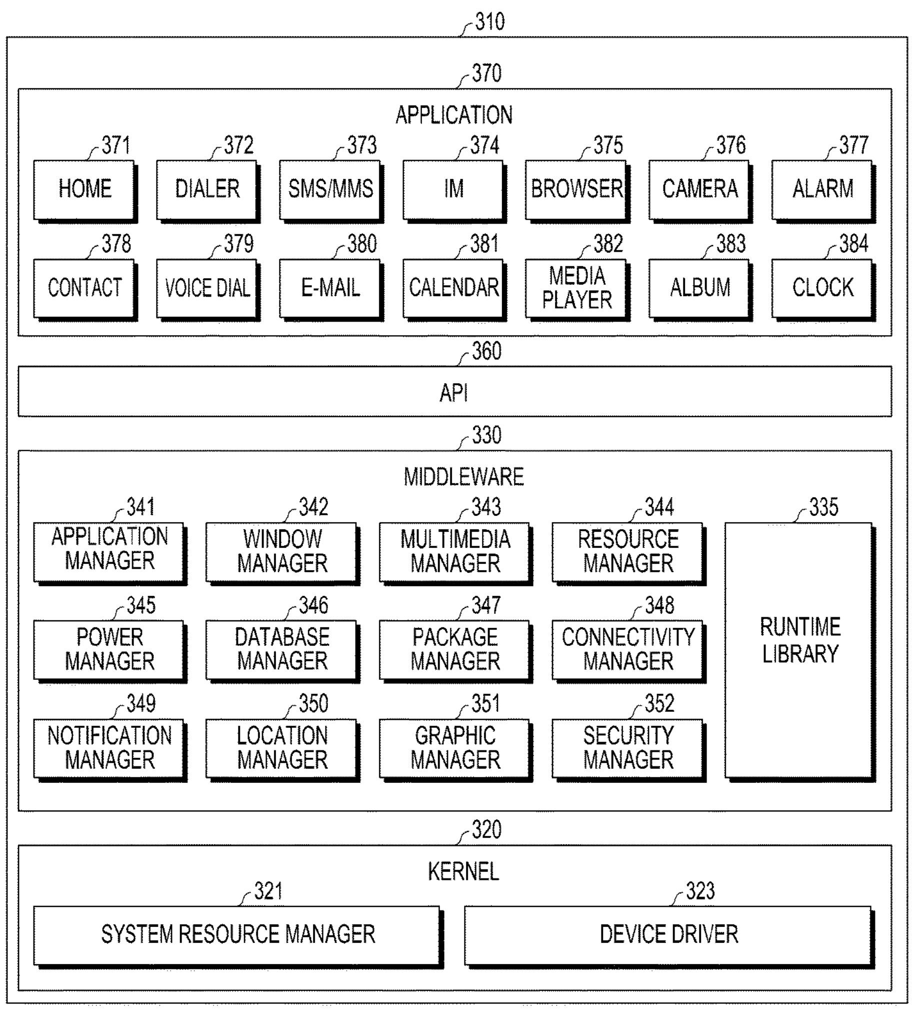
FIG. 3 is a block diagram of a program module, according to an embodiment of the present disclosure.

FIG. 3 is a block diagram of a program module, according to an embodiment of the present disclosure.

The program module 310 may include an OS that controls resources relating to an electronic device (e.g., the electronic device 101) and/or various applications (e.g., the application 147) running on the OS. The OS may be Android™, iOS™, Windows™, Symbian™, Tizen™, Samsung Bada OS™, etc.

The program module 310 includes a kernel 320, middleware 330, an API 360, and applications 370. At least a part of the program module 310 may be preloaded on the electronic device, or may be downloaded from an external electronic device (e.g., the first and second external electronic devices 102 or 104, or the server 106).

The kernel 320 includes a system resource manager 321 and a device driver 323. The system resource manager 321 may control, allocate, or retrieve system resources. The system resource manager 321 may include a process management portion, a memory management portion, or a file system management portion. The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 such that the applications 370 can efficiently use limited system resources within the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, etc.

The application manager 341 may manage the life cycle of at least one of the applications 370. The window manager 342 may manage GUI resources used for a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, etc., of at least one of the applications 370.

The power manager 345 may operate together with a basic input/output system (BIOS), etc. and may manage a battery or power, and may provide power information and the like required for an operation of the electronic apparatus. The database manager 346 may generate, search for, and/or change a database to be used by at least one of the applications 370. The package manager 347 may manage the installation or update of an application that is distributed in the form of a package file.

The connectivity manager 348 may manage a wireless connection, such as Wi-Fi, BT, etc. The notification manager 349 may display or notify of an event, such as an arrival message, an appointment, a proximity notification, etc., in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, etc. When the electronic device has a telephone call function, the middleware 330 may further include a telephony manager that manages a voice or video call function of the electronic device.

The middleware 330 may include a middleware module that forms a combination of various functions of the above-described elements. The middleware 330 may provide specialized modules according to the types of OSs in order to provide differentiated functions. Furthermore, the middleware 330 may dynamically remove some of the existing elements, or may add new elements.

The API 360 is a set of API programming functions, and may be provided with different configurations according to an OS. For example, in the case of Android™ or iOS™, one API set may be provided for each platform, and in the case of Tizen™, two or more API sets may be provided for each platform.

The applications 370 may include one or more applications that can perform functions, such as a home application 371, a dialer application 372, an SMS/MMS application 373, an instant message application (1M) 374, a browser application 375, a camera application 376, an alarm application 377, a contacts application 378, a voice dialer application 379, an e-mail application 380, a calendar 381 application, a media player application 382, an album application 383, a clock application 384, a health care application (e.g., measure exercise quantity or blood glucose), or an environment information application (e.g., atmospheric pressure, humidity, temperature information or the like).

The applications 370 may include an application (hereinafter, referred to as an information exchange application for convenience of description) that supports information exchange between the electronic device and an external electronic device. The information exchange application may include a notification relay application for transferring specific information to an external electronic device or a device management application for managing an external electronic device.

The notification relay application may include a function for delivering, to the external electronic device, notification information generated by other applications (e.g., an SMS/MMS application, an email application, a health care application, an environmental information application, etc.) of the electronic device. Further, the notification relay application may receive notification information from the external electronic device and may provide the received notification information to a user.

The device management application may manage (e.g., install, delete, or update at least one function of an external electronic device that communicates with the electronic device (e.g., a function of turning on/off the external electronic device itself (or some components thereof) or a function of adjusting the brightness (or resolution) of a display), applications that operate in the external electronic device, or services (e.g., a call service, a message service, etc.) that are provided by the external electronic device.

The applications 370 may include applications (e.g., a health care application of a mobile medical appliance, etc.) designated according to the attributes of an external electronic device. The applications 370 may include applications received from an external electronic device. The applications 370 may include a preloaded application or a third party application that may be downloaded from a server. The names of the elements of the program module 310 may vary according to the type of operating system.

At least a part of the programming module 310 may be implemented in software, firmware, hardware, or a combination of two or more thereof. At least some of the program module 310 may be implemented (e.g., executed) by a processor (for example, the processor 210). At least some of the program module 310 may include a module, a program, a routine, a set of instructions, and/or a process for performing one or more functions.

Figure 4:
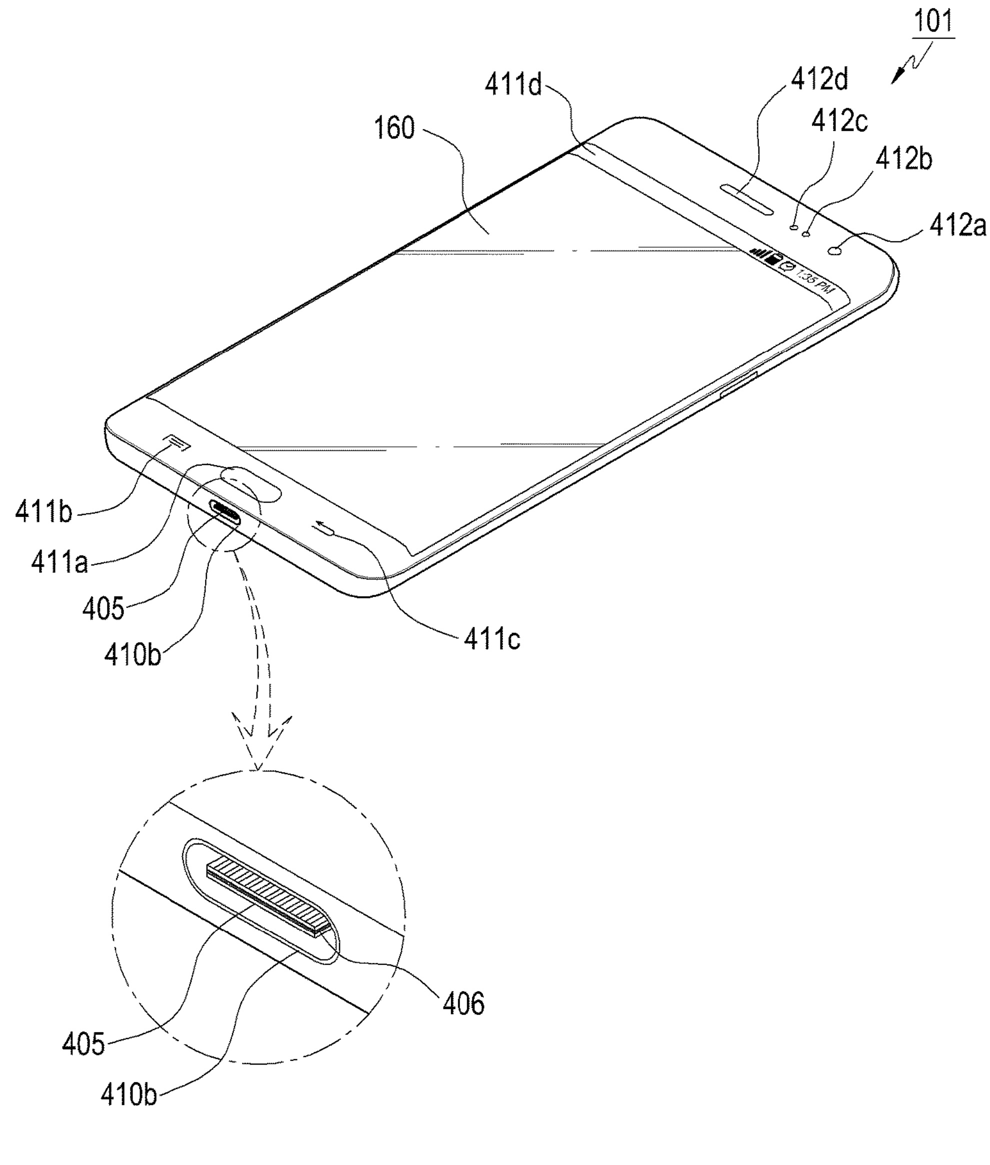
FIG. 4 is a perspective view of a front side of an electronic device, according to an embodiment of the present disclosure.

FIG. 4 is a perspective view of a front side of an electronic device, according to an embodiment of the present disclosure.

Referring to FIG. 4, the electronic device 101 may be a smartphone including a USB type-C connector 410*b* (connector 410*b*), a wearable device, a TV, or a tablet PC. The connector 410*b* of the electronic device 101 may be considered a receptacle, and the accessory-side of the connector 410*b* that can be fastened to the receptacle may be considered a plug.

As illustrated in FIG. 4, the display 160 capable of sensing a touch and hovering may be arranged at the center of the front surface of the electronic device 101. The display 160 may occupy a majority of the front surface of the electronic device 101. FIG. 4 illustrates an example in which a main home screen is displayed on the display unit 160. The main home screen is the first screen that is displayed on the touch screen 160 when the electronic device 10 is turned on. Further, when the electronic device 101 has several pages of different home screens, the main home screen may be the first of the several pages of home screens. On the home screen, short-cut icons for executing frequently used applications, a main menu switch key, time, weather, etc., may be displayed. The main menu switching key may display a menu screen on the touch screen 160. Further, a status bar for displaying states such as a battery charging state, the intensity of a reception signal, or a current time may be formed at an upper end of the display unit 160. A home key 411*a*, a menu button 411*b*, and a backward button 411*c* may be formed on the lower portion of the display 160.

The home key 411*a* may display a main home screen of the display 160. When the home key 411*a* is touched while any home screen different from the main home screen or the menu screen is displayed, the main home screen may be displayed on the touch screen 160. In addition, when the home key 411*a* is touched while applications are executed on the display 160, the main home screen may be displayed on the display 160. The home button 411*a* may also be used to display recently used applications or a task manager on the touch screen 160. The menu button 411*b* may be used to provide a connectivity menu that may be used on the touch screen 160. The connectivity menu may include a widget addition menu, a background switching menu, a search menu, an editing menu, an environment setting menu, etc. The backward button 411*c* may display the screen executed just before the currently executed screen, or may terminate the most recently used application.

An upper end area of the front surface of the electronic device 101 includes a first camera 412*a*, a luminance sensor 412*b*, a proximity sensor 412*c*, and a speaker 412*d*. The electronic device 101 may have a connector 410*b* that can electrically connect the electronic device 101 with an external electronic device. The connector 410*b* may be used as an interface for connecting the electronic device 101 with the first external electronic device 102 or with a power source. The electronic device 101 may transmit data, which is stored in the memory 130 of the electronic device 101, to the first external electronic device 102 through a wired cable connected to the connector 410*b* under the control of the processor 120 or may receive data from the first external electronic device 102. In addition, the electronic device 101 may receive power input from the power source through a wired cable connected to the connector 410*b* or may charge the battery using the power source. The connector 410*b* may be a USB type-C and may have a contact substrate 405 formed therein. A mid plate 406 having characteristics of an electric conductor may be formed inside the contact substrate 405. In addition, a plurality of pins may be formed on the upper and lower surfaces of the contact substrate 406. The electronic device 101 may be connected to the first external electronic device 102 through the connector 410*b* in a wired manner. The connector 410*b* may have an exterior formed such that either upward mounting or downward mounting of a pin of the first external electronic device 102 on the connector 410*b* is possible. The pin of the first external electronic device 102 can be inserted into the connector 410*b* in any direction. In addition, the plurality of pins formed on the upper and lower surfaces of the contact substrate 405 may be arranged such that data transmission/reception or power reception is possible no matter what direction the terminal of the first external electronic device 102 is inserted.

Figure 5:
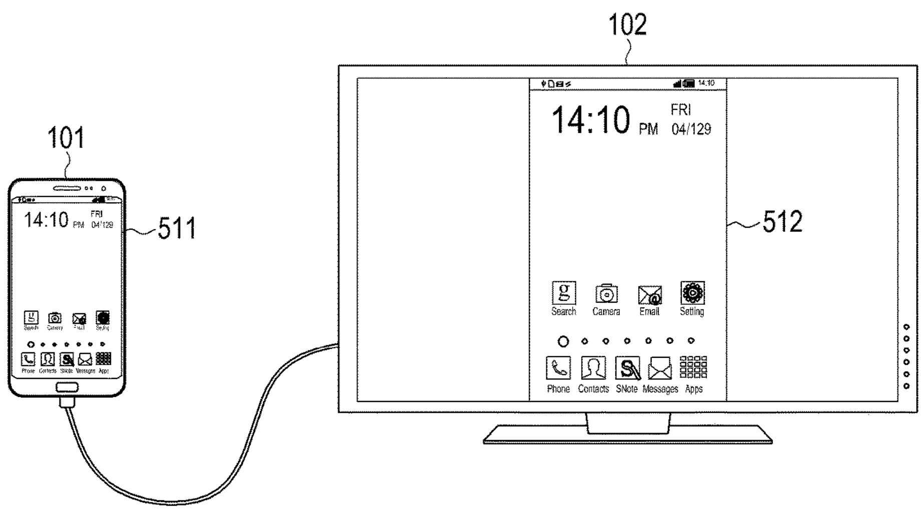
FIG. 5 is a diagram of a connection between an electronic device and an external electronic device through a USB, according to an embodiment of the present disclosure.

FIG. 5 is a diagram of a connection between an electronic device and an external electronic device through a USB, according to an embodiment of the present disclosure.

Referring to FIG. 5, when the electronic device 101 and the first external electronic device 102 are connected through a USB, the electronic device 101 may function as a host (or a master), and the first external electronic device 102 may function as a device (or a slave).

The first external electronic device 102 may include a TV equipped with a USB type-C connector and a touch screen. When connected to an electronic device 101 functioning as a host (or a master) through a USB-type C connector, the first external electronic device 102 may function as a device (or a slave). The first external electronic device 102 may include one of the aforementioned electronic devices.

The electronic device 101 may transmit content to the first external electronic device 102. The electronic device 101 may transmit a screen image 511 currently displayed on the display 160 to the first external electronic device 102. The first external electronic device 102 may magnify the screen image (a magnified screen image is illustrated by reference number 512) received from the electronic device 101 by a predetermined magnification and may display the same. The screen image 511 displayed on the electronic device 101 may display the same information as the magnified screen image 512 displayed on the first external electronic device 102. When the electronic device 101 transmits content, such as images or moving pictures, stored in the memory 130 to the first external electronic device 102, the first external electronic device 102 may display the received content.

Figure 6:
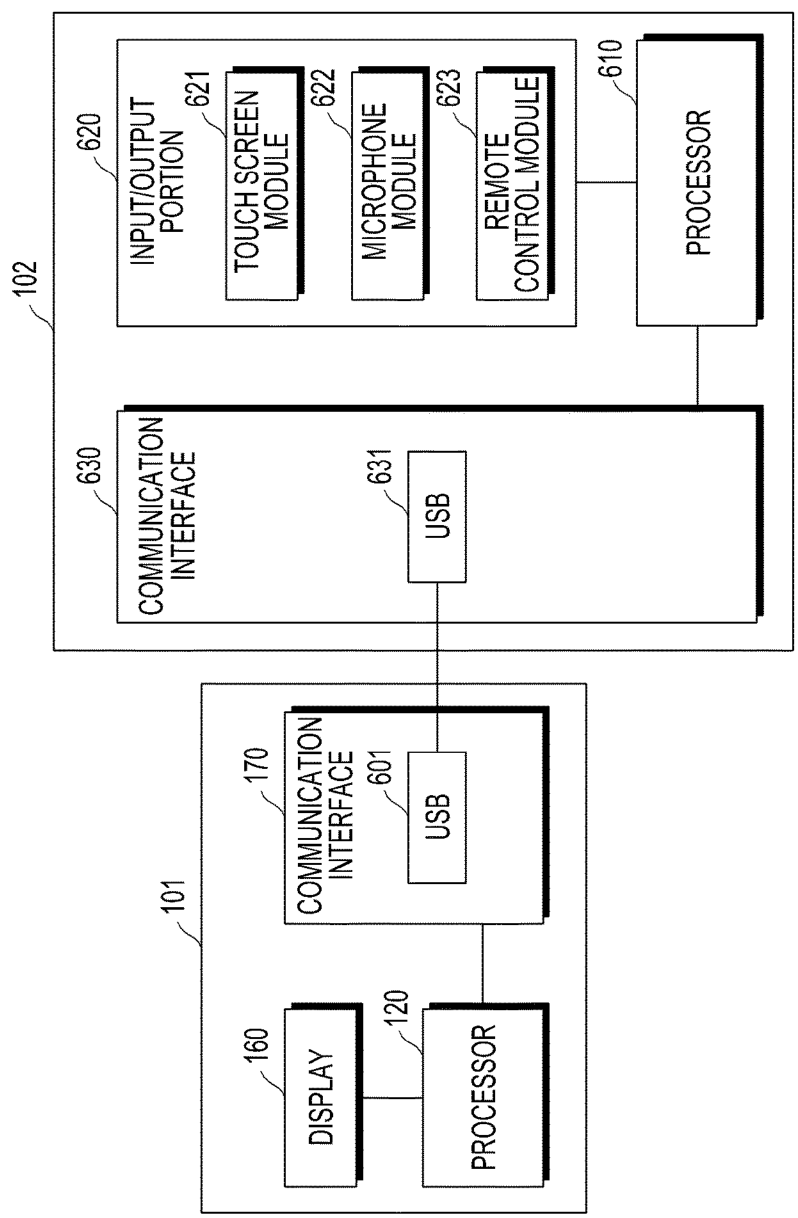
FIG. 6 is a block diagram of an electronic device and an external electronic device, according to an embodiment of the present disclosure.

FIG. 6 is a block diagram of an electronic device and an external electronic device, according to an embodiment of the present disclosure.

Referring to FIG. 6, the electronic device 101 includes the display 160, the communication interface 170 including a USB connector 601, and the processor 120, and the first external electronic device 102 includes a communication interface 630 including a USB connector 631, an input/output portion 620, and a processor 610. The input/output portion 620 of the first external electronic device 102 may include a touch screen module 621 that displays content and senses a user's touch input, a microphone module 622 that receives a voice command, and a remote control module 623 that receives a control command input by a remote control. Modules 621, 622, and 623 included in the input/output portion 620 of the first external electronic device 102 may be included in the input/output portion 620 or may not be included therein according to the type of the first external electronic device 102, the provided service, the function, the position of installation, and the like.

The display 160 may display content (e.g., pictures, images, documents, screen images, etc.) processed by the processor 120. The display 160 may display a screen image controlled by the processor 120 based on user data received from the first external electronic device 102.

The communication interface 170 may include a USB type-C connector.

When connected to an external electronic device using the USB type-C connector, the processor 120 may transmit content displayed on the display 160 to the first external electronic device 102. The processor 120 may control the electronic device 101 based on user data received from the first external electronic device 102. Assuming that the first external electronic device 102 is a TV, and the content currently displayed on the display 160 is displayed on the input/output portion 620 of the TV: if a user's command inputted through the TV is received via the communication interface 630 of the first external electronic device 102 and through the communication interface 170 of the electronic device 101, the processor 120 may control the electronic device 101 based on the received command.

The communication interface 170 may include a USB type-C connector.

The input/output portion 620 of the external electronic device 102 includes a touch screen module 621 that displays content and senses the user's touch input, a microphone module 622 that receives a voice command, and a remote control module 623 that receives a control command input by the remote control. The touch screen module 621 may display content received from the electronic device 101 or may receive the user's command input on the displayed content. The touch screen module 621 may perform at least one operation or function performed by the display 160 of the electronic device 101. The microphone module 622 may receive the user's voice command, and the remote control module 623 may receive a command input using the remote control such that the external electronic device 102 can be controlled remotely.

The processor 610 of the external electronic device 102 may perform at least one function or operation performed by the processor 120 illustrated in FIG. 1. The processor 610 may transmit a user command, which is received by at least one module included in the input/output portion 620, to the electronic device 101. When a physical connection with the electronic device 101 is sensed, the processor 610 may transmit information relating to the first external electronic device 102 to the electronic device 101. When information relating to a specific pin that enables user data transmission is received from the electronic device 101, the processor 610 may set up a channel of communication with the electronic device 101 based on the specific pin of the electronic device 101. When a user input is received through the input/output portion 620, the processor 610 may generate user data based on the user input and may convert the format of the generated user data. The processor 610 may transmit the user data, the format of which has been converted, to the electronic device 101 through the specific pin. The processor 610 may transfer a user command (e.g., a touch point's coordinate value, pressure intensity, a command input through the remote control) inputted by the input/output portion 620 to a power transfer chip through an I2C protocol (e.g., a serial protocol for a two-wire interface used to connect low-speed devices) or an I3C protocol (e.g., a bus interface for connecting sensors to an application processor). The power transfer chip may transmit received I2C (or I3C) data to the electronic device 101 through the USB type-C using a Bi-phase Mark Coding (BMC) protocol. The processor 610 may modulate a user command (e.g., a touch-based command, a command input through the remote control), which is input through the input/output portion 620, into a BMC protocol and may transmit the same to the electronic device 101. Upon receiving the modulated user command, the electronic device 101 may perform an operation corresponding to the user command through BMC protocol demodulation and I2C (or I3C) conversion.

An electronic device may include: a display; a communication interface comprising a USB (universal serial bus) type-C connector; and at least one processor electrically connected to the display and to the communication interface, wherein the processor senses a connection with an external electronic device using the USB type-C connector, receives information regarding the external electronic device from the external electronic device in response to the connection, receives user data, which has been input through an input/output portion provided on the external electronic device, from the external electronic device through a specific pin of the USB type-C connector, and controls the electronic device on the basis of the received user data.

The user data may include a command input to the external electronic device by a user.

The processor may determine a method of communication with the external electronic device if the information is received, and the determined method of communication may include an alternate mode.

The processor may perform a control such that, if the method of communication is determined, content is transmitted to the external electronic device through a transmitting pin of the USB type-C connector, and the content may include a screen image currently displayed on the display.

The processor may set up a channel of communication with the external electronic device through the specific pin of the USB type-C.

The specific pin of the USB type-C may be a pin that receives information regarding the external electronic device, and may include at least one selected from a configuration channel (CC) pin and a USB 2.0 pin of the USB type-C connector.

The processor may inform the external electronic device that the user data can be transmitted using the specific pin of the USB type-C.

The received information may comprise at least one selected from an identifier of the external electronic device, power information, and information needed to determine a method of communication.

The user data may comprise at least one of information regarding a touch coordinate on a screen image displayed on a touch screen provided on the input/output portion of the external electronic device, a pressure value of a pressure touch, a resolution change, a brightness, a voice command input through a microphone, and a control command by a remote control.

The processor may perform a control so as to transmit content to the external electronic device using a transmitting pin of the USB type-C connector, to receive the user data from the external electronic device using the specific pin of the USB type-C connector, and to accordingly perform bidirectional communication with the external electronic device.

An electronic device may include: a display; an input/output portion; a communication interface comprising a USB type-C connector; and at least one processor electrically connected to the display and to the communication interface, wherein the processor senses a connection with an external electronic device using the USB type-C connector, receives first information regarding the external electronic device from the external electronic device in response to the connection, and transmits user data, which has been input through the input/output portion, to the external electronic device through a specific pin of the USB type-C connector.

Figure 7:
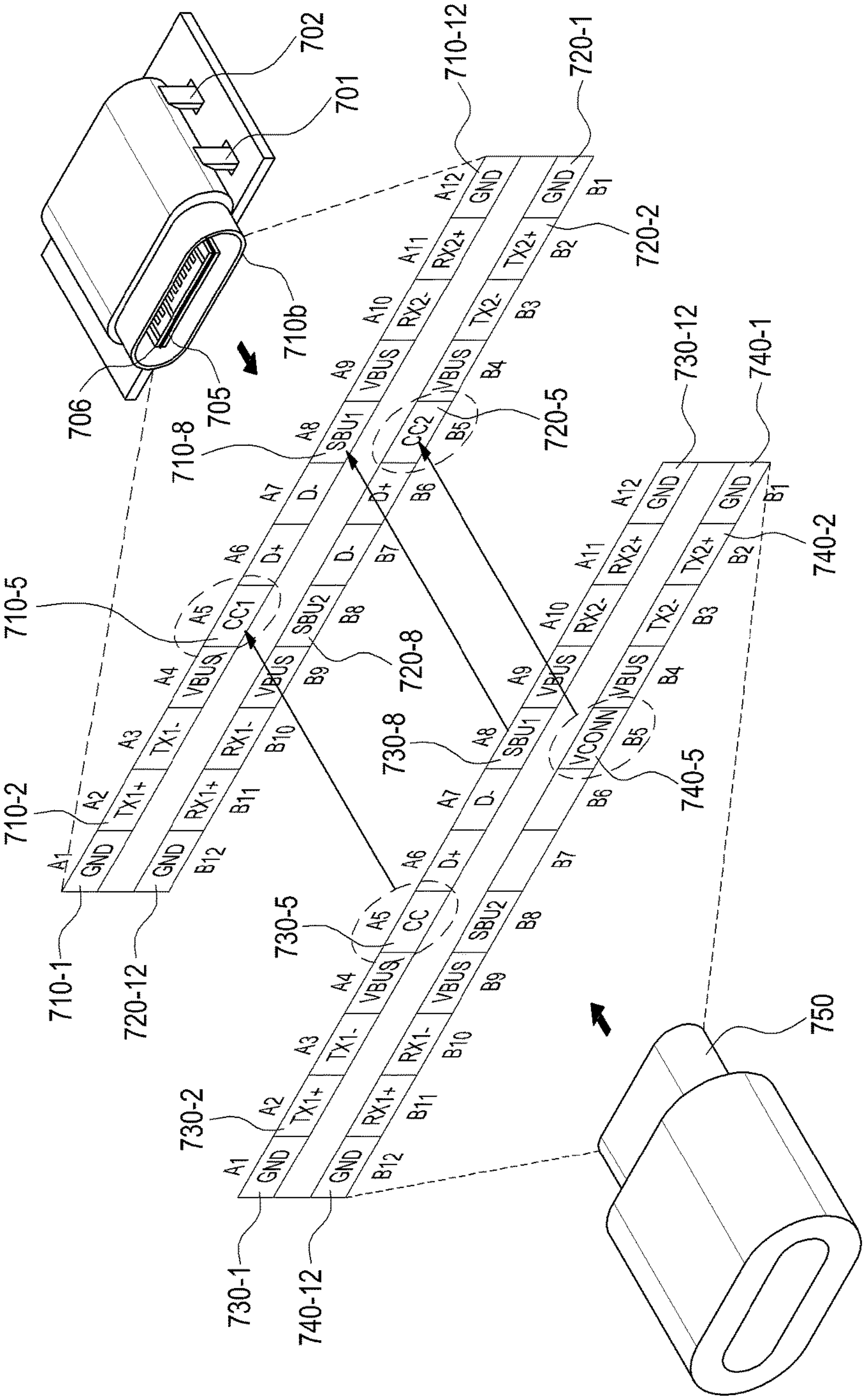
FIG. 7 is a diagram of a plurality of pins formed on a contact substrate of an electronic device and on a contact substrate of an external electronic device, according to an embodiment of the present disclosure.

FIG. 7 is a diagram of a plurality of pins formed on a contact substrate of an electronic device and on a contact substrate of an external electronic device, according to an embodiment of the present disclosure.

The electronic device 101 may also be connected to the first external electronic device 102 through a connector **710*b*. The connector 710*b* of the electronic device 101 may have an exterior formed such that the connector 750 of the first external electronic device 102 can be inserted in any direction, and a contact substrate 705 may be formed inside the connector 710*b*. The contact substrate 705 may have twelve pins 710-1, 710-2, . . . , 710-12 formed on the upper surface thereof and may have twelve pins 720-1, 720-2, . . . , 720-12 formed on the lower surface thereof. A mid plate 706 having the characteristics of an electric conductor may be formed inside the contact substrate 705. In addition, the connector 750 of the first external electronic device 102 may have twelve pins 730-1, 730-2, . . . , 730-12 formed on the upper end thereof so as to contact the twelve pins 710-1, 710-2, . . . , 710-12 formed on the upper surface of the contact substrate 705 and may have twelve pins 740-1, 740-2, . . . , 740-12 formed on the lower end thereof so as to contact the twelve pins 720-1, 720-2, . . . , 720-12 formed on the lower surface of the contact substrate 705. The number of pins configured on the connector of the first external electronic device 102 may differ depending on the type of the electronic device. In addition, the first external electronic device 102 may have one CC pin or two depending on the type. The order of arrangement of the twelve pins formed on the upper surface may be identical to the order of arrangement of the twelve pins formed on the lower surface such that the connector 750 of the first external electronic device 102 can be inserted in any direction. This structure allows the user to insert the cable of the external electronic device 102 into the connector 710***b* of the electronic device 101 while the cable remains rotated by 180°.

The arrangement of pins formed on the upper and lower surfaces of the contact substrate 705 is given in Table 1 below:

TABLE 1

| Pin | Pin Name | Function | Note |
|---|---|---|---|
| 1 | 1 GND | Power | Support for 60 W minimum (combined with all VBUS pins) |
| 2 | 2 TX1+ | USB 3.1 or Alternate Mode | 10 Gb/s differential pair with TX1− |
| 3 | 3 TX1− | USB 3.1 or Alternate Mode | 10 Gb/s differential pair with TX1+ |
| 4 | 4 VBUS | Power | Support for 60 W minimum (combined with all VBUS pins) |
| 5 | 5 CC1 | CC or VCONN | — |
| 6 | 6 D+ | USB 2.0 | — |
| 7 | 7 D− | USB 2.0 | — |
| 8 | 8 SBU1 | Alternate Mode | Lower speed side band signal |
| 9 | 9 VBUS | Power | Support for 60 W minimum (combined with all VBUS pins) |
| 10 | 10 RX2− | USB 3.1 or Alternate Mode | 10 Gb/s differential pair with RX2+ |
| 11 | 11 RX2+ | USB 3.1 or Alternate Mode | 10 Gb/s differential pair with RX2− |
| 12 | 12 GND | Power | Support for 60 W minimum (combined with all VBUS pins) |

The USB type-C has twenty-four pins formed thereon, and the twenty-four pins may be arranged in a mirrored configuration as a result of reversibility. This structure allows the user to rotate the connector 750 of the first external electronic device 102 by 180° and to mount the same on the connector 710*b* of the electronic device 101. For example, when TX1+ and TX1− are used, TX2+, TX2−, RX2+, and RX2− may not be used; and, when RX1+ and RX1− are used, RX2+, RX2−, TX2+, and TX2− may not be used. In this manner, an electrically conductive mid plate 706 is included in the contact substrate 705 of the connector 710*b*. In addition, a total of twenty-four pins exist on the contact substrate 705 (e.g., twelve on the upper surface and twelve on the lower surface), but corresponding pins may not be used simultaneously. Pins to be used may be determined according to the connected cable, the connector attached to an end of the cable, and the connectivity of the connector 705 of the electronic device 101 connected to the connector.

The CC1 pin 710-5 formed on the upper surface of the contact substrate 705 and the CC2 pin 720-5 formed on the lower surface thereof may be used to recognize the usage of the first external electronic device 102 connected to the connector 710*b*. For example, when the upper surface of the connector 750 of the external electronic device 102 is inserted into the connector 710*b* of the electronic device 101 while facing upward, such that the CC1 pin 710-5 of the electronic device 101 is connected to the CC pin 730-5 of the first external electronic device 102, the CC2 pin 720-5 of the electronic device 101 may be used to supply power VCONN for an IC for recognizing the first external electronic device 102. In addition, when the upper surface of the connector 750 of the first external electronic device 102 is inserted into the connector 710*b* of the electronic device 101 while facing downward such that the CC2 pin 720-5 of the electronic device 101 is connected to the CC pin 730-5 of the first external electronic device 102, the CC1 pin 710-5 of the electronic device 101 may be used to supply power VCONN for an IC for recognizing the first external electronic device 102. The CC pins 710-5 and 720-5 of the electronic device 101 may be connected to the CC or VCONN of the first external electronic device 102, and the CC pins 710-5 and 720-5 of the electronic device 101 may support the CC and VCONN.

The SBU 1 pin 710-8 and the SBU 2 pin 720-8 of the electronic device 101 are low-speed signal pins allocated to be used in an alternate mode. Negotiation of such an alternate mode between the electronic device 101 and the first external electronic device 102 may be requested before transmitting/receiving power.

Figure 8:
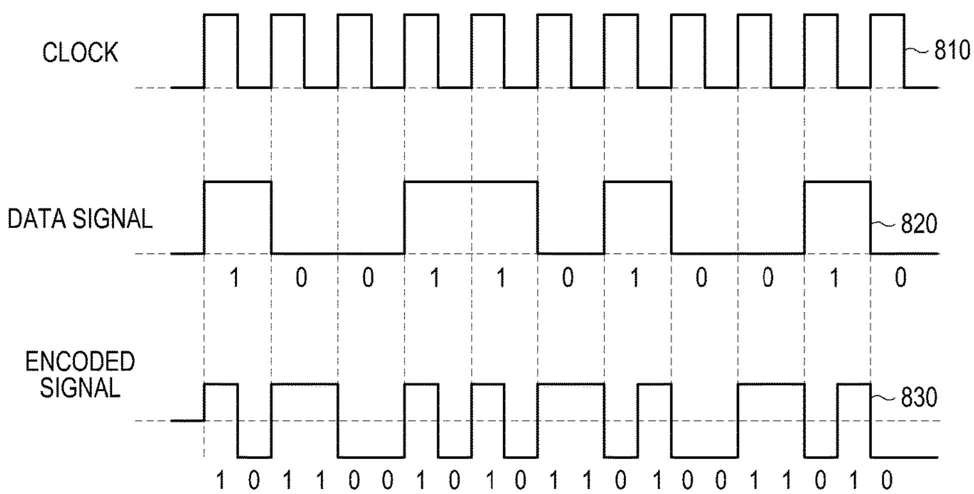
FIG. 8 is a diagram of encoding of BMC communication between an electronic device and an external electronic device, according to an embodiment of the present disclosure.

FIG. 8 is a diagram of encoding of BMC communication between an electronic device and an external electronic device, according to an embodiment of the present disclosure.

Referring to FIG. 8, the electronic device 101 may perform BMC communication with the first external electronic device 102 in such manner that a clock and data are included in a single transmission line. The clock frequency 810 is two times the data signal frequency 820. All bits of data can be expressed in terms of two logical states. Every logical 1 of input can be output as two different bits (10 or 01) according to the preceding value. Similarly, when logical 0 is input, two identical bits (00 or 11) may be output. When the bit value of the encoded signal 830 changes from 1 to 0 or changes from 0 to 1, the data signal 820 has the value of 1, and, when the bit value of the encoded signal 830 does not change, the data signal 820 has a value of 0. Furthermore, if 1 or 0 bits occur consecutively, the problem of asynchronism may occur, but the BMC communication provides at least one zero-crossing inside two-bit data, and so the problem of asynchronism of serial communication can be avoided.

Figure 9:
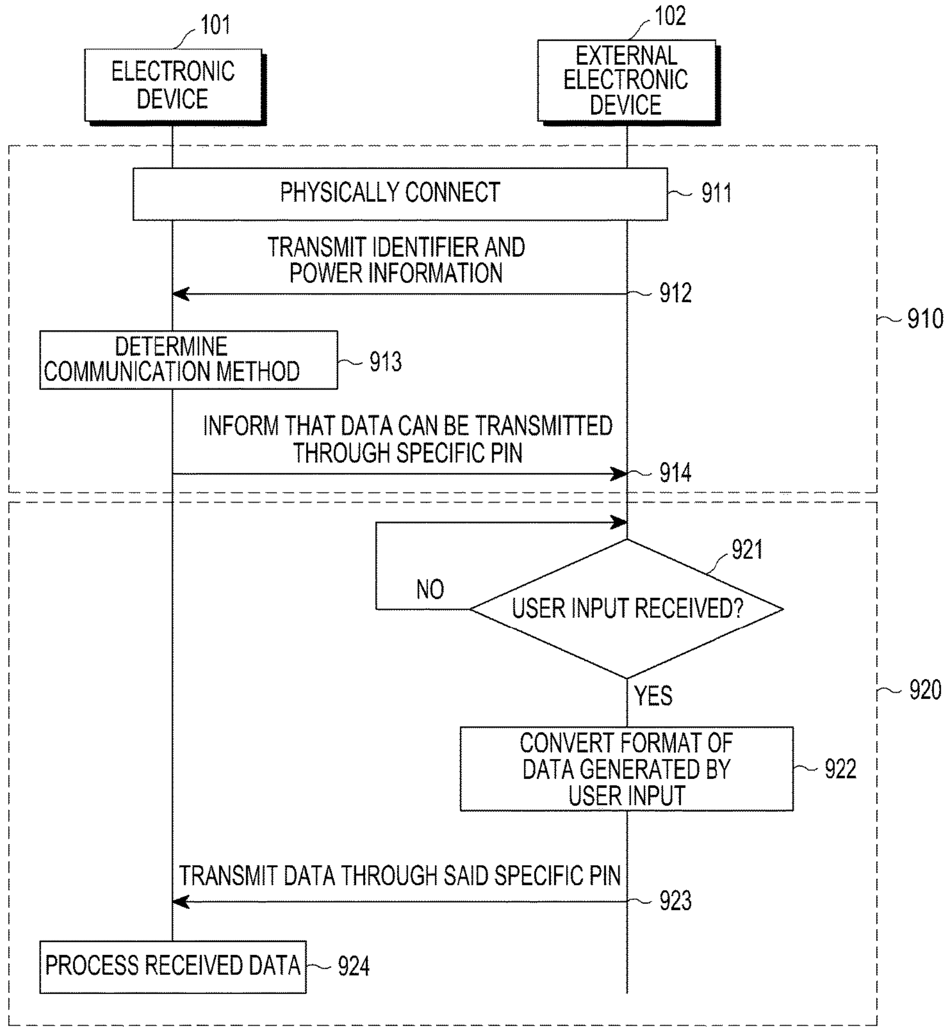
FIG. 9 is a signaling diagram of a method for performing communication between an electronic device and an external electronic device, according to an embodiment of the present disclosure.

FIG. 9 is a signaling diagram of a method for performing communication between an electronic device and an external electronic device, according to an embodiment of the present disclosure.

In step 911, the electronic device 101 and the first external electronic device 102 may be physically connected. The electronic device 101 may be physically connected to the first external electronic device 102 through a USB cable. The electronic device 101 and the first external electronic device 102 have USB type-C connectors formed on the exterior thereof, and may be connected through a USB cable.

In step 912, the first external electronic device 102 using the processor 610 may transmit information regarding the first external electronic device 102 to the electronic device 101. BMC communication may be performed while the electronic device 101 and the first external electronic device 102 are connected to each other through a USB cable. When the electronic device 101 and the first external electronic device 102 are physically connected, the electronic device 101 may request the first external electronic device 102 to provide information regarding the first external electronic device 102 through a USB cable. Alternatively, when the electronic device 101 and the first external electronic device 102 are physically connected, the first external electronic device 102 may transmit information regarding the first external electronic device 102 to the electronic device 101 through the USB cable. The information may be transmitted through a specific pin of USB type-C. When the electronic device 101 and the first external electronic device 102 are physically connected, the electronic device 101 may request the first external electronic device 102 to provide at least one selected from the identifier of the first external electronic device 102, power information, and information needed to determine a communication method through a CC pin of USB type-C. Alternatively, when the electronic device 101 and the first external electronic device 102 are physically connected, the external electronic device 102 may transmit at least one selected from the identifier of the first external electronic device 102, power information, and information needed to determine a communication method through the CC pin of USB type-C.

In step 913, the electronic device 101 may determine a communication method. The electronic device 101 may determine to use a USB with the first external electronic device 102 through BCM communication using the CC pin of USB type-C, or may determine to switch to an alternate mode such as peripheral component interconnect express (PCIe) or display port (DP). The electronic device 101 may determine the communication method when information regarding the first external electronic device 102 is received.

In step 914, the electronic device 101 may notify the first external electronic device 102 that data transmission through a specific pin is possible. The electronic device 101 may transmit information to the first external electronic device 102 to inform the first external electronic device 102 to transmit data using a specific pin. The first external electronic device 102 may determine that data can be transmitted to the electronic device 101 through a specific pin based on the information received from the electronic device 101. The specific pin may include at least one selected from a CC pin and a USB 2.0 pin of the USB type-C connector. The electronic device 101 may notify the first external electronic device 102 that the first external electronic device 102 can transmit data using the CC pin of USB type-C. The first external electronic device 102 may transmit data to the electronic device 101 using the CC pin of USB type-C. The electronic device 101 may inform the first external electronic device 102 that data transmission through a specific pin is possible, and may set up a channel of communication with the external electronic device 102. The electronic device 101 may set up a channel of communication with the first external electronic device 102 based on the CC pin of USB type-C. After the method of communication with the first external electronic device 102 is determined, the electronic device 101 may transmit content to the first external electronic device 102. Alternatively, the electronic device 101 may inform the first external electronic device 102 that data transmission through a specific pin is possible, and may transmit content to the first external electronic device 102. The electronic device 101 may transmit content to the first external electronic device 102 using a TX pin of USB type-C. The content may include the screen image currently displayed on the display 160 of the electronic device 101. Alternatively, the content may include data, such as images and pictures, stored in the memory 130 of the electronic device 101.

Steps 911, 912, 913, and 914 correspond to a BMC communication step 910. The electronic device 101 may acquire at least one piece of information selected from the identifier of the external electronic device 102, power information, and information for determining the communication method from the external electronic device 102 using the CC pin of USB type-C during the BMC communication step 910. In addition, the electronic device 101 may notify the first external electronic device 102 that the first external electronic device 102 can transmit data using the CC pin of USB type-C.

In step 921, the first external electronic device 102 using the processor 610 may determine whether a user input is received or not. The first external electronic device 102 may receive content from the electronic device 101. The first external electronic device 102 may receive content from the electronic device 101 using a TX pin of USB type-C. The first external electronic device 102 may output the content received from the electronic device 101 through the touch screen module 621 of the input/output portion 620. When the electronic device 101 transmits the screen image currently displayed on the display 160 to the first external electronic device 102, the first external electronic device 102 may adjust the magnification of the screen image displayed on the display 160 of the electronic device 101 and may output the same through the touch screen module 621. The screen image currently displayed on the display 160 by the electronic device 101 and the screen image displayed on the touch screen module 621 of the first external electronic device 102 may be identical, except for the size difference resulting from magnification adjustment. The user may watch the screen image displayed on the touch screen module 621 of the first external electronic device 102 instead of the screen image displayed on the display 160 of the electronic device 101. The first external electronic device 102 may sense an input resulting from the user's touch or hovering and may sense an input resulting from a pressure input. The user may use the screen image displayed on the touch screen module 621 of the first external electronic device 102 in order to control the screen image displayed on the display 160 of the electronic device 101. The first external electronic device 102 may sense an input made by the user while a screen image is being displayed on the touch screen module 621. The input may include at least one selected from a touch, hovering, and a pressure input. In addition, the input may include the user's voice command and a control command input through the remote control.

In step 922, the first external electronic device 102 (may convert the format of data generated by a user input. The first external electronic device 102 may generate data when a user input is sensed. When a user input is sensed, the first external electronic device 102 may analyze the input user data and may generate data. The data may include information regarding the coordinate of a touch on the screen image displayed on the touch screen provided on the input/output portion 620 of the first external electronic device 102, the pressure value of a pressure touch, the screen's resolution change, and the screen's brightness. The data may include a voice command input through the microphone and a control command input through the remote control. The first external electronic device 102 may convert various values resulting from a user input into a data format of I2C. For example, the first external electronic device 102 may transfer a user command (e.g., the coordinate value of a touch point, pressure intensity, and a command input through the remote control), which is input through the input/output portion 620, to a power transfer chip through an I2C (or I3C) protocol. The power transfer chip may transmit the received I2C (or I3C) data to the electronic device 101 through USB type-C using the BMC protocol. The first external electronic device 102 may modulate a user command (e.g., a touch-based command or a command input through the remote control), which is input through the input/output portion 620, into a BMC protocol and may transmit the same to the electronic device 101. After receiving the modulated user command, the electronic device 101 may perform an operation corresponding to the user command through BMC protocol demodulation and I2C (or I3C) conversion.

In step 923, the first external electronic device 102 may transmit data to the electronic device 101 through the specific pin. The first external electronic device 102 may convert various values resulting from a user input into a data format of I2C and may transmit the converted data to the electronic device 101. After being notified by the electronic device 101 that data transmission through a specific pin is possible, the first external electronic device 102 may transmit the converted data to the electronic device 101 using the specific pin. After being notified by the electronic device 101 that data transmission through a USB type-CC pin is possible, the first external electronic device 102 may transmit the converted data to the electronic device 101 using the USB type-CC pin. Alternatively, after being notified by the electronic device 101 that data transmission through a CC pin of USB type-C is possible, the first external electronic device 102 may transmit the converted data to the electronic device 101 using a USB 2.0 pin of USB type-C connector.

In step 924, the electronic device 101 may process data received from the first external electronic device 102. The electronic device 101 may receive data through the specific pin. The electronic device 101 may process the data received through the specific pin and may control the electronic device 101 according to the user input. The electronic device 101 may receive data through the CC pin of USB type-C connector or may receive data through the USB 2.0 pin of USB type-C connector. Assuming that the electronic device 101 has transmitted the screen image displayed on the display 160 to the first external electronic device 102, if a command based on a user input sensed on the touch screen module 621 of the first external electronic device 102 is received from the external electronic device 102, the screen image displayed on the display 160 may be controlled based on the received command. The electronic device 101 may transmit content to the first external electronic device 102 using a TX pin of the USB type-C connector and may perform bidirectional communication with the first external electronic device 102 such that the user data is received from the first external electronic device 102 using a specific pin (e.g., CC pin and/or USB 2.0 pin) of the USB type-C connector.

Figure 10:
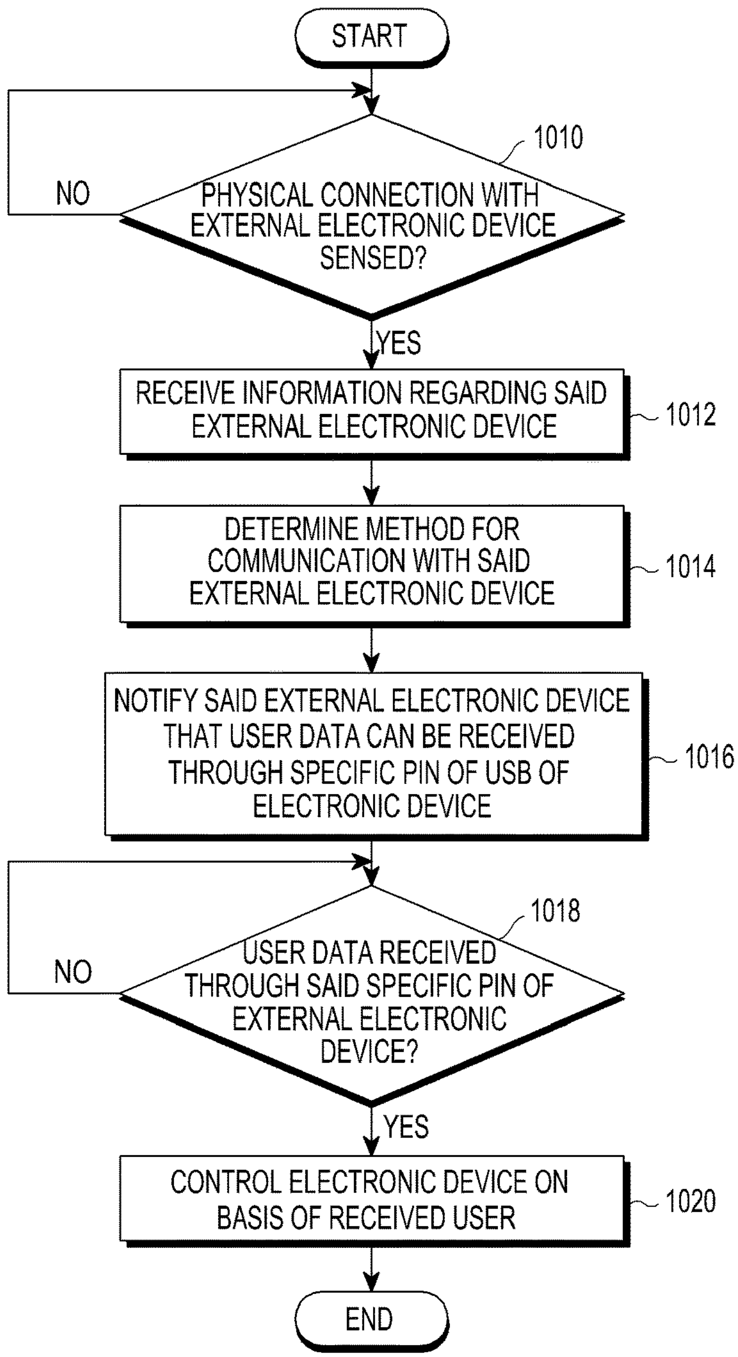
FIG. 10 is a flowchart of a method for receiving user data from an external electronic device by an electronic device, according to an embodiment of the present disclosure.

FIG. 10 is a flowchart of a method for receiving user data from an external electronic device by an electronic device, according to an embodiment of the present disclosure.

In step 1010, the electronic device 101 may sense a physical connection with the first external electronic device 102. The electronic device 101 may be physically connected with the first external electronic device 102 through a USB cable. The electronic device 101 and the first external electronic device 102 have USB type-C connectors formed on the exterior thereof and may be connected through a USB cable.

In step 1012, the electronic device 101 (may receive information regarding the first external electronic device 102. The electronic device 101 may perform BMC communication with the first external electronic device 102 while being connected therewith through a USB cable. When the electronic device 101 and the first external electronic device 102 are physically connected, the electronic device 101 may request the first external electronic device 102 to provide information regarding the external electronic device 102 through the USB cable. The information may be transmitted through a specific pin of USB type-C. When the electronic device 101 and the first external electronic device 102 are physically connected, the electronic device 101 may request the first external electronic device 102 to provide at least one selected from the identifier of the first external electronic device 102, power information, and information for determining a communication method through a CC pin of USB type-C. Then, the electronic device 101 may receive at least one selected from the identifier of the first external electronic device 102, power information, and information needed to determine a communication method from the first external electronic device 102 in response to the request.

In step 1014, the electronic device 101 may determine a method of communication with the first external electronic device 102. The electronic device 101 may determine to use a USB with the first external electronic device 102 through BMC communication using the CC pin of USB type-C, or may determine to switch to an alternate mode such as PCIe or DP. The electronic device 101 may determine the communication method when information regarding the first external electronic device 102 is received.

In step 1016, the electronic device 101 may notify the first external electronic device 102 that user data can be received using a specific pin of the USB of the electronic device 101. The electronic device 101 may transmit information to the first external electronic device 102 so as to inform that the first external electronic device 102 can transmit data using a specific pin. The specific pin may include at least one selected from a CC pin and a USB 2.0 pin of the USB type-C connector. The electronic device 101 may notify the first external electronic device 102 that the first external electronic device 102 can transmit data using the CC pin of USB type-C. The electronic device 101 may receive data from the first external electronic device 102 using the CC pin of USB type-C. The electronic device 101 may inform the first external electronic device 102 that data transmission through a specific pin is possible, and may set up a channel of communication with the first external electronic device 102. The electronic device 101 may set up a channel of communication with the first external electronic device 102 based on the CC pin of USB type-C. After the method of communication with the first external electronic device 102 is determined, the electronic device 101 may transmit content to the first external electronic device 102. Alternatively, the electronic device 101 may inform the first external electronic device 102 that data transmission through a specific pin is possible, and may transmit content to the first external electronic device 102. The electronic device 101 may transmit content to the first external electronic device 102 using a TX pin of USB type-C. The content may include the screen image currently displayed on the display 160 of the electronic device 101. Alternatively, the content may include data, such as images and pictures, stored in the memory 130 of the electronic device 101. The electronic device 101 may receive the identifier of the first external electronic device 102 and power information through the above-mentioned steps 911 to 914) and may notify the first external electronic device 102 that data can be transmitted through specific pins of USB type-C of the electronic device 101 and the first external electronic device 102.

In step 1018, the electronic device 101 may receive user data form the first external electronic device 102 through the specific pin. The electronic device 101 may transmit content to the first external electronic device 102. The electronic device 101 may transmit content to the first external electronic device 102 using a TX pin of USB type-C. The electronic device 101 may receive data generated in response to sensing of a user input from the first external electronic device 102. When a user input is sensed, the first external electronic device 102 may analyze the input user data and may generate data. The data may include information regarding the coordinate of a touch on the screen image displayed on the touch screen provided on the input/output portion 620 of the first external electronic device 102, the pressure value of a pressure touch, the screen's resolution change, and the screen's brightness. The data may include a voice command input through the microphone and a control command input through the remote control. The first external electronic device 102 may convert various values resulting from a user input into a data format of I2C. The electronic device 101 may receive data generated by converting various values resulting from a user input into a data format of I2C by the first external electronic device 102. The electronic device 101 may notify the first external electronic device 102 that data can be transmitted through a specific pin (e.g., CC pin) and may receive the converted data from the first external electronic device 102 using the specific pin (e.g., CC pin). Alternatively, the electronic device 101 may notify the first external electronic device 102 that data can be transmitted using a USB 2.0 pin of USB type-C connector and may receive the converted data from the first external electronic device 102 using the USB 2.0 pin of USB type-C connector.

In step 1020, the electronic device 101 may control the electronic device 101 based on the received user data. The electronic device 101 may receive data received through a specific pin. The electronic device 101 may process the data received through the specific pin and may control the electronic device 101 according to the user input. The electronic device 101 may receive data through the CC pin of USB type-C or may receive data through the USB 2.0 pin of USB type-C connector. Assuming that the electronic device 101 has transmitted the screen image displayed on the display 160 to the external electronic device 102, if a command based on a user input sensed on the touch screen module 621 of the first external electronic device 102 is received from the first external electronic device 102, the screen image displayed on the display 160 may be controlled based on the received command. The electronic device 101 may transmit content to the first external electronic device 102 using a TX pin of the USB type-C connector and may perform bidirectional communication with the first external electronic device 102 such that the user data is received from the first external electronic device 102 using a specific pin (e.g., CC pin and/or USB 2.0 pin) of the USB type-C connector.

Figure 11:
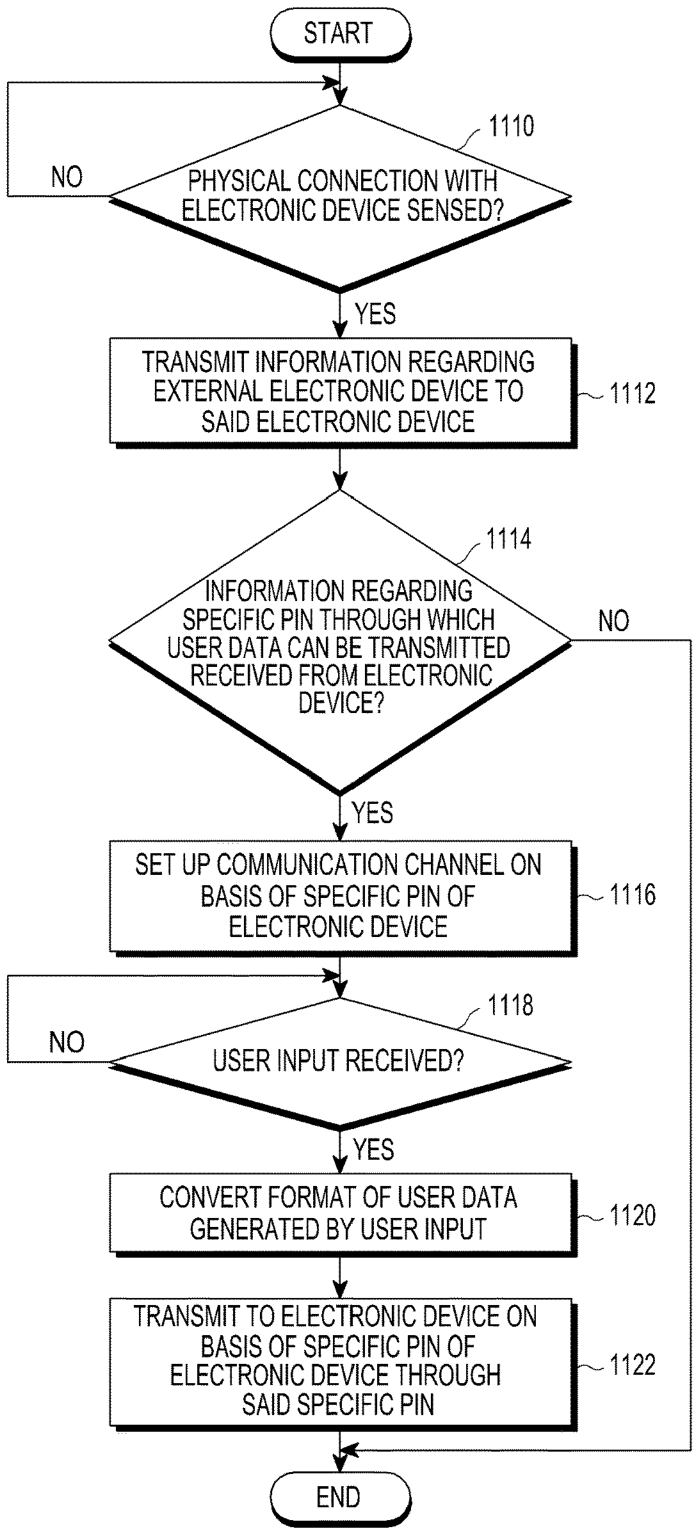
FIG. 11 is a flowchart of a method for transmitting user data to an electronic device by an external electronic device, according to an embodiment of the present disclosure.

FIG. 11 is a flowchart of a method for transmitting user data to an electronic device by an external electronic device, according to an embodiment of the present disclosure.

In step 1110, the first external electronic device 102 may sense a physical connection with the electronic device 101. The first external electronic device 102 may be physically connected to the electronic device 101 through a USB cable. The first external electronic device 102 and the electronic device 101 have USB type-C connectors formed on the exterior thereof and may be connected through a USB cable.

In step 1112, the first external electronic device 102) may transmit information regarding the first external electronic device 102 to the electronic device 101. The electronic device 101 and the first external electronic device 102 may perform BMC communication while being connected to each other through a USB cable. When the electronic device 101 and the first external electronic device 102 are physically connected, the first external electronic device 102 may receive a request for information regarding the first external electronic device 102 from the electronic device 101 through the USB cable. Alternatively, when the electronic device 101 and the first external electronic device 102 are connected physically, the first external electronic device 102 may transmit information regarding the first external electronic device 102 to the electronic device 101 through the USB cable. The information may be transmitted through a specific pin of USB type-C. When the electronic device 101 and the first external electronic device 102 are physically connected, the first external electronic device 102 may receive a request for at least one selected from the identifier of the first external electronic device 102, power information, and information needed to determine the communication method from the electronic device 101 through a CC pin of USB type-C. Alternatively, when the electronic device 101 and the first external electronic device 102 are physically connected, the external first electronic device 102 may transmit at least one selected from the identifier of the first external electronic device 102, power information, and information needed to determine the communication method through the CC pin of USB type-C.

In step 1114, the first external electronic device 102 may receive information regarding a specific pin through which user data can be transmitted from the electronic device 101. The first external electronic device 102 may receive information, which notifies that the electronic device 101 can transmit data using a specific pin, from the electronic device 101. The specific pin may include at least one selected from a CC pin and a USB 2.0 pin of the USB type-C connector. The first external electronic device 102 may be notified by the electronic device 101 that the electronic device 101 can receive data using the CC pin of USB type-C. The first external electronic device 102 may transmit data to the electronic device 101 using the CC pin of USB type-C. The first external electronic device 102 may receive notification that data can be transmitted through a specific pin from the electronic device 101 and may set up a channel of communication with the electronic device 101. The first external electronic device 102 may set up a channel of communication with the electronic device 101 based on the CC pin of USB type-C. After the method of communication with the electronic device 101 is determined, the first external electronic device 102 may receive content from the electronic device 101. Alternatively, the first external electronic device 102 may be notified by the electronic device 101 that data can be transmitted through a specific pin and may receive content from the electronic device 101. The first external electronic device 102 may receive content from the electronic device 101 using a TX pin of USB type-C. The content may include the screen image currently displayed on the display 160 of the electronic device 101. Alternatively, the content may include data, such as images and pictures, stored in the memory 130 of the electronic device 101.

In step 1116, the first external electronic device 102 may set up a communication channel based on a specific pin of the electronic device 101. When information regarding a specific pin through which user data can be transmitted is received from the electronic device 101, the first external electronic device 102 may set up a channel of communication with the electronic device 101 based on the specific pin of the electronic device 101. The first external electronic device 102 may set up a channel of communication with the electronic device 101 based on the CC pin of USB type-C.

In step 1118, the external electronic device 102 may receive an input made by the user. The first external electronic device 102 may output the content received from the electronic device 101 through the touch screen module 621 of the input/output portion 620. When the electronic device 101 transmits the screen image currently displayed on the display 160 to the first external electronic device 102, the first external electronic device 102 may adjust the magnification of the screen image displayed on the display 160 of the electronic device 101 and may output the same through the touch screen module 621. The screen image currently displayed on the display 160 by the electronic device 101 and the screen image displayed on the touch screen module 621 of the first external electronic device 102 may be identical, except for the size difference resulting from magnification adjustment. The user may watch the screen image displayed on the touch screen module 621 of the first external electronic device 102 instead of the screen image displayed on the display 160 of the electronic device 101. The touch screen module 621 of the first external electronic device 102 may sense an input resulting from the user's touch or hovering and may sense an input resulting from a pressure input. The user may use the screen image displayed on the touch screen module 621 of the first external electronic device 102 in order to control the screen image displayed on the display 160 of the electronic device 101. The first external electronic device 102 may sense an input made by the user while a screen image is being displayed on the touch screen module 621. The input may include at least one selected from a touch, hovering, and a pressure input. In addition, the input may include the user's voice command and a control command input through the remote control.

In step 1120, the first external electronic device 102 may convert the format of user data generated by a user input. The first external electronic device 102 may generate data when a user input is sensed and may convert the format of the generated data. When a user input is sensed, the first external electronic device 102 may analyze the input user data and may generate data. The data may include information regarding the coordinate of a touch on the screen image displayed on the touch screen provided on the input/output portion 620 of the first external electronic device 102, the pressure value of a pressure touch, the screen's resolution change, and the screen's brightness. The data may include a voice command input through the microphone and a control command input through the remote control. The first external electronic device 102 may convert various values resulting from a user input into a data format of I2C. For example, the first external electronic device 102 may transfer a user command (e.g., the coordinate value of a touch point, pressure intensity, and a command input through the remote control), which is input through the input/output portion 620, to a power transfer chip through an I2C (or I3C) protocol. The power transfer chip may transmit the received I2C (or I3C) data to the electronic device 101 through USB type-C using the BMC protocol. For example, the first external electronic device 102 may modulate a user command (e.g., a touch-based command or a command input through the remote control), which is input through the input/output portion 620, into a BMC protocol and may transmit the same to the electronic device 101. After receiving the modulated user command, the electronic device 101 may perform an operation corresponding to the user command through BMC protocol demodulation and I2C (or I3C) conversion.

In step 1122, the first external electronic device 102 may transmit user data, the format of which has been converted, to the electronic device 101 through the specific pin. The first external electronic device 102 may convert various values resulting from a user input into a data format of I2C and may transmit the converted data to the electronic device 101. After being notified by the electronic device 101 that data can be transmitted through a specific pin, the first external electronic device 102 may transmit the converted data to the electronic device 101 using the specific pin. After being notified by the electronic device 101 that data can be transmitted using the CC pin of USB type-C, the first external electronic device 102 may transmit the converted data to the electronic device 101 using the CC pin of USB type-C. Alternatively, after being notified by the electronic device 101 that data can be transmitted using the CC pin of USB type-C, the first external electronic device 102 may transmit the converted data to the electronic device 101 using the USB 2.0 pin of USB type-C connector.

Figure 12:
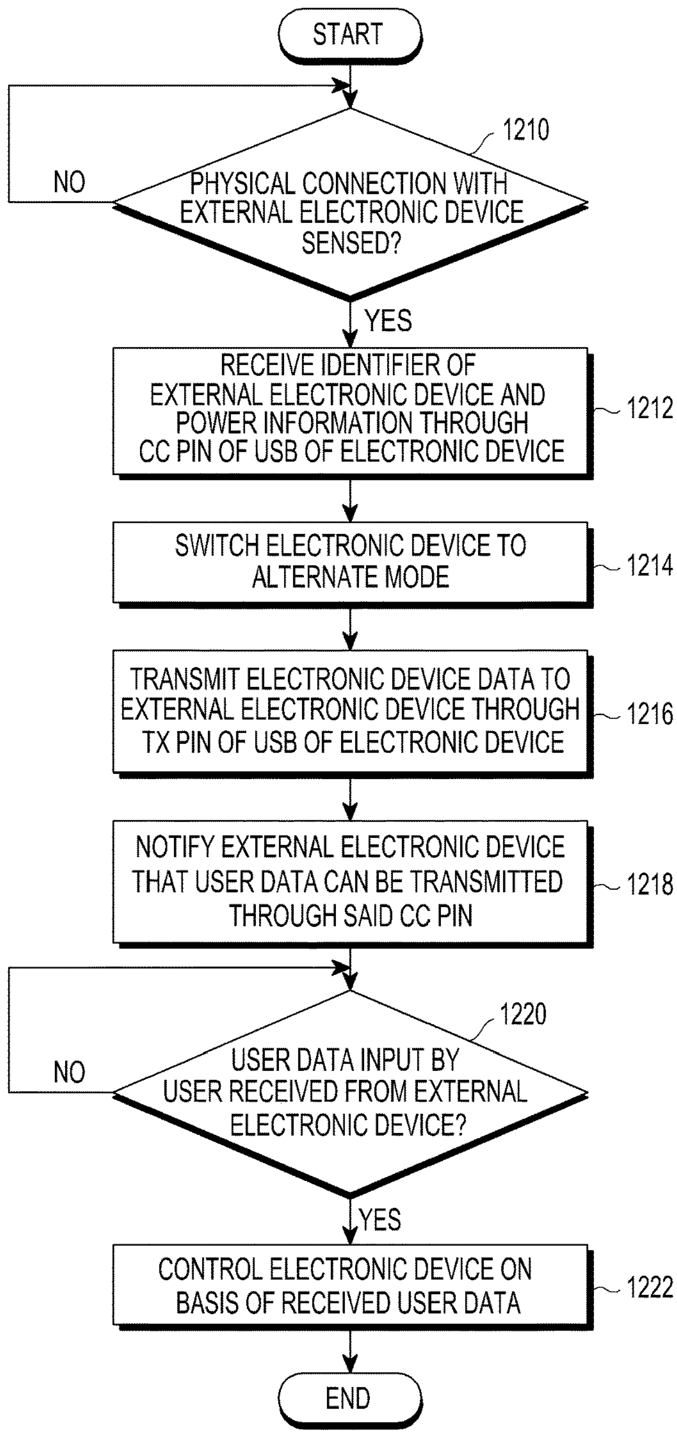
FIG. 12 is a flowchart of a method for receiving user data from an external electronic device by an electronic device, according to an embodiment of the present disclosure.

FIG. 12 is a flowchart of a method for receiving user data from an external electronic device by an electronic device, according to an embodiment of the present disclosure.

In step 1210, the electronic device 101 may sense a physical connection with the first external electronic device 102. The electronic device 101 may be physically connected with the first external electronic device 102 through a USB cable. The electronic device 101 and the first external electronic device 102 have USB type-C connectors formed on the exterior thereof and may be connected through a USB cable.

In step 1212, the electronic device 101 may receive the identifier of the first external electronic device and power information through the CC pin of USB type-C. When the electronic device 101 and the first external electronic device 102 are physically connected, the electronic device 101 may request the first external electronic device 102 to provide information regarding the first external electronic device 102 through a USB cable. The information may be transmitted through a specific pin of USB type-C. When the electronic device 101 and the first external electronic device 102 are physically connected, the electronic device 101 may request the first external electronic device 102 to provide at least one selected from the identifier of the first external electronic device 102, power information, and information needed to determine a communication method through a CC pin of USB type-C. The electronic device 101 may receive at least one selected from the identifier of the first external electronic device 102, power information, and information needed to determine a communication method from the first external electronic device 102 in response to the request.

In step 1214, the electronic device 101 may switch the electronic device 101 to an alternate mode. The electronic device 101 may determine to use a USB with the first external electronic device 102 through BCM communication using the CC pin of USB type-C, or may determine to switch to an alternate mode, such as PCIe or DP. The electronic device 101 may determine the communication method when information regarding the first external electronic device 102 is received.

In step 1216, the electronic device 101 may transmit data regarding the electronic device 101 to the first external electronic device 102 through the TX pin of USB type-C of the electronic device 101. The electronic device 101 may inform the first external electronic device 102 that data can be transmitted through the CC pin of USB type-C and may set up a channel of communication with the first external electronic device 102. The electronic device 101 may set up a channel of communication with the first external electronic device 102 based on the CC pin of USB type-C. After the method of communication with the external electronic device 102 is determined, the electronic device 101 may transmit content to the first external electronic device 102 through the TX pin of USB type-C. Alternatively, the electronic device 101 may inform the first external electronic device 102 that data can be transmitted through the CC pin of USB type-C and may transmit content to the first external electronic device 102 through the TX pin of USB type-C. The electronic device 101 may transmit content to the first external electronic device 102 using the TX pin of USB type-C. The content may include the screen image currently displayed on the display 160 of the electronic device 101. Alternatively, the content may include data, such as images and pictures, stored in the memory 130 of the electronic device 101.

In step 1218, the electronic device 101 may notify the first external electronic device 102 that user data can be transmitted through the CC pin. The electronic device 101 may transmit information to the first external electronic device 102 so as to inform that the first external electronic device 102 can transmit data using the CC pin of USB type-C. The specific pin may include at least one selected from a CC pin and a USB 2.0 pin of USB type-C connector. The electronic device 101 may notify the first external electronic device 102 that the first external electronic device 102 can transmit data using the CC pin of USB type-C. The electronic device 101 may receive data from the first external electronic device 102 using the CC pin of USB type-C. The electronic device 101 may inform the first external electronic device 102 that data can be transmitted through the CC pin of USB type-C and may set up a channel of communication with the first external electronic device 102.

In step 1220, the electronic device 101 may receive user data input by the user from the first external electronic device 102. The electronic device 101 may transmit content to the first external electronic device 102 using the TX pin of USB type-C. The electronic device 101 may receive data generated in response to sensing of a user input from the first external electronic device 102. When a user input is sensed, the first external electronic device 102 may analyze the input user data and may generate data. The data may include information regarding the coordinate of a touch on the screen image displayed on the touch screen provided on the input/output portion 620 of the first external electronic device 102, the pressure value of a pressure touch, the screen's resolution change, and the screen's brightness. The data may include a voice command input through the microphone and a control command input through the remote control. The first external electronic device 102 may convert various values resulting from a user input into a data format of I2C. The electronic device 101 may receive data obtained by converting various values resulting from a user input into a data format of I2C by the first external electronic device 102. The electronic device 101 may notify the first external electronic device 102 that data can be transmitted through a specific pin (e.g., CC pin) and may receive the converted data from the first external electronic device 102 using the specific pin (e.g., CC pin). Alternatively, the electronic device 101 may notify the first external electronic device 101 that data can be transmitted using a USB 2.0 pin of USB type-C connector and may receive the converted data from the first external electronic device 102 using the USB 2.0 pin of USB type-C connector.

In step 1222, the electronic device 101 may control the electronic device 101 based on the received user data. The electronic device 101 may receive data through the USB 2.0 pin of USB type-C connector. The electronic device 101 may process the data received through the USB 2.0 pin of USB type-C connector and may control the electronic device 101 according to the user input. Assuming that the electronic device 101 has transmitted the screen image displayed on the display 160 to the external electronic device 102, if a command based on a user input sensed on the touch screen module 621 of the first external electronic device 102 is received from the first external electronic device 102, the screen image displayed on the display 160 may be controlled based on the received command. The electronic device 101 may transmit content to the first external electronic device 102 using a TX pin of the USB type-C connector and may perform bidirectional communication with the first external electronic device 102 such that the user data is received from the first external electronic device 102 using a specific pin (e.g., CC pin and/or USB 2.0 pin) of the USB type-C connector.

A method of performing communication with an external electronic device by an electronic device having a USB (universal serial bus) type-C may include the operations of: sensing a connection with an external electronic device using a connector of the USB type-C; receiving information regarding the external electronic device from the external electronic device in response to the connection; receiving user data, which has been input through an input/output portion provided on the external electronic device, from the external electronic device through a specific pin of the USB type-C; and controlling the electronic device on the basis of the received user data.

The method may further include an operation of determining a method of communication with the external electronic device when the information is received, and the determined method of communication may include an alternate mode.

The method may further include an operation of transmitting content to the external electronic device through a transmitting pin of the USB type-C when the method of communication is determined, and the content may include a screen image currently displayed on a display.

The method may further include an operation of setting up a channel of communication with the external electronic device through the specific pin of the USB type-C.

The specific pin of the USB type-C may be a pin that receives information regarding the external electronic device, and may include at least one selected from a CC pin and a USB 2.0 pin of the USB type-C connector.

The method may further include an operation of informing the external electronic device that the user data can be transmitted using the specific pin of the USB type-C connector.

The received information may include at least one selected from an identifier of the external electronic device, power information, and information needed to determine a method of communication.

The user data may include at least one selected from information regarding a touch coordinate on a screen image displayed on a touch screen provided on the input/output portion of the external electronic device, a pressure value of a pressure touch, a resolution change, brightness, a voice command input through a microphone, and a control command by a remote control.

The method may further include an operation of transmitting content to the external electronic device using a transmitting pin of the USB type-C, receiving the user data from the external electronic device using the specific pin of the USB type-C, and accordingly performing bidirectional communication with the external electronic device.

At least some of the devices (e.g., modules or functions thereof) or the method (e.g., operations) may be implemented by a command stored in a non-transitory computer-readable storage medium in a programming module form. When the command is executed by control circuits, the control circuits may perform a function corresponding to the command. The non-transitory computer-readable storage medium may be the memory 130. At least some of the programming modules may be implemented (e.g., executed) by the processor 120. At least some of the programming modules may include a module, a program, a routine, a set of instructions or a process for performing one or more functions.

The non-transitory computer readable recoding medium includes magnetic media such include magnetic media, such as a hard disk, a floppy disk and a magnetic tape, optical media, such as a CD-ROM and a DVD, magneto-optical media, such as a floptical disk, and a hardware device specially configured to store and execute a program command, such as a ROM, a RAM and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed in a different order or may be omitted, or other operations may be added. A non-transitory recording medium that stores commands for a method of performing communication with an external electronic device having a USB type C may include: a first command set that instructs sensing a connection with an external electronic device using a connector of the USB type-C; a second command set that instructs receiving information regarding the external electronic device in response to the connection; a third command set that instructs notifying the external electronic device that user data can be transmitted through a specific pin of the USB type-C; a fourth command set that instructs receiving the user data through the specific pin of the USB type-C; and a fifth command set that instructs controlling the electronic device based on the received user data.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
- a display;
- a communication interface comprising a universal serial bus (USB) type-C connector; and
- at least one processor operatively connected to the display and to the communication interface and configured to:
  - detect a connection with an external electronic device using the USB type-C connector,
  - receive information relating to the external electronic device from the external electronic device in response to the connection through a first pin among a plurality of pins of the USB type-C connector,
  - receive user data, which has been inputted through an input/output component of the external electronic device, from the external electronic device through the first pin among the plurality of pins of the USB type-C connector, and
  - control the electronic device based on the received user data,
- wherein the electronic device corresponds to a master device and the external electronic device corresponds to a slave device.

2. The electronic device of claim 1, wherein the user data comprises a command inputted to the external electronic device by a user.

3. The electronic device of claim 1, wherein the processor is further configured to determine a method of communication with the external electronic device if the information relating to the external electronic device is received, and the determined method of communication comprises an alternate mode.

4. The electronic device of claim 3, wherein the processor is further configured to:
- if the method of communication is determined, transmit content to the external electronic device through a transmitting pin of the USB type-C connector,
- wherein the content comprises a screen image currently displayed on the display.

5. The electronic device of claim 1, wherein the processor is further configured to set up a channel of communication with the external electronic device through the first pin of the USB type-C connector.

6. The electronic device of claim 1, wherein the first pin of the USB type-C connector is a pin that receives the information relating to the external electronic device and comprises one of a configuration channel (CC) pin of the USB type-C connector and a USB 2.0 pin.

7. The electronic device of claim 1, wherein the processor is further configured to inform the external electronic device that the user data can be transmitted using the first pin of the USB type-C connector.

8. The electronic device of claim 1, wherein the received information relating to the external electronic device comprises one of an identifier of the external electronic device, power information, and first information needed to determine a method of communication.

9. The electronic device of claim 1, wherein the user data comprises at least one of first information regarding a touch coordinate on a screen image displayed on a touch screen provided on the input/output component of the external electronic device, a pressure value of a pressure touch, a resolution change, a brightness, a voice command input through a microphone, and a control command by a remote control.

10. The electronic device of claim 1, wherein the processor is further configured to transmit content to the external electronic device using a transmitting pin of the USB type-C connector, receive the user data from the external electronic device using the first pin of the USB type-C connector, and perform bidirectional communication with the external electronic device.

11. A method of an electronic device comprising a universal serial bus (USB) type-C connector for communicating with an external electronic device, the method comprising:
- detecting a connection with the external electronic device using the USB type-C connector;
- receiving information relating to the external electronic device from the external electronic device in response to the connection through a first pin among a plurality of pins of the USB type-C connector;
- receiving user data, which has been inputted through an input/output component of the external electronic device, from the external electronic device through the first pin among the plurality of pins of the USB type-C connector; and controlling the electronic device based on the received user data, wherein the electronic device corresponds to a master device and the external electronic device corresponds to a slave device.

12. The method of claim 11, wherein the method further comprises determining a method of communication with the external electronic device when the information relating to the external electronic device is received, and the determined method of communication comprises an alternate mode.

13. The method of claim 12, wherein the method further comprises transmitting content to the external electronic device through a transmitting pin of the USB type-C connector when the method of communication is determined, and the content comprises a screen image currently displayed on a display.

14. The method of claim 11, wherein the method further comprises setting up a channel of communication with the external electronic device through the first pin of the USB type-C connector.

15. The method of claim 11, wherein the first pin of the USB type-C connector is a pin that receives the information relating to the external electronic device and comprises one of a configuration channel (CC) pin of the USB type-C connector and a USB 2.0 pin.

16. The method of claim 11, wherein the method further comprises informing the external electronic device that the user data can be transmitted using the first pin of the USB type-C connector.

17. The method of claim 11, wherein the information relating to the external electronic device comprises one of an identifier of the external electronic device, power information, and first information needed to determine a method of communication.

18. The method of claim 11, wherein the user data comprises at least one of first information regarding a touch coordinate on a screen image displayed on a touch screen provided on the input/output component of the external electronic device, a pressure value of a pressure touch, a resolution change, a brightness, a voice command input through a microphone, and a control command by a remote control.

19. The method of claim 11, wherein the method further comprises transmitting content to the external electronic device using a transmitting pin of the USB type-C connector, receiving the user data from the external electronic device using the first pin of the USB type-C connector, and performing bidirectional communication with the external electronic device.

20. An electronic device comprising:

a display;

an input/output component;

a communication interface comprising a universal serial bus (USB) type-C connector; and at least one processor electrically connected to the display and to the communication interface and configured to:

detect a connection with an external electronic device using the USB type-C connector, receive first information regarding the external electronic device from the external electronic device in response to the connection through a first pin among a plurality of pins of the USB type-C connector, and transmit user data, which has been inputted through the input/output component, to the external electronic device through the first pin among the plurality of pins of the USB type-C connector, wherein the electronic device corresponds to a master device and the external electronic device corresponds to a slave device.

21. A non-transitory computer-readable recording medium having stored thereon a plurality of instructions that when executed cause an electronic device comprising a universal serial bus (USB) type-C connector to communicate with an external electronic device using a method comprising:

detecting a connection with the external electronic device using the USB type-C connector;

receiving information relating to the external electronic device from the external electronic device in response to the connection through a first pin among a plurality of pins of the USB type-C connector;

receiving user data, which has been inputted through an input/output component of the external electronic device, from the external electronic device through the first pin among the plurality of pins of the USB type-C connector; and controlling the electronic device based on the received user data, wherein the electronic device corresponds to a master device and the external electronic device corresponds to a slave device.

* * * * *